(12) United States Patent
Beveridge et al.

(10) Patent No.: US 11,605,283 B1
(45) Date of Patent: *Mar. 14, 2023

(54) DISASTER PREPARATION SYSTEM

(71) Applicant: UIPCO, LLC, San Antonio, TX (US)

(72) Inventors: Meredith Beveridge, Golden, CO (US); Michael J. Maciolek, Boerne, TX (US); Robert Wiseman Simpson, Fair Oaks Ranch, TX (US); Daniel Christopher Bitsis, Jr., San Antonio, TX (US); Bobby Lawrence Mohs, San Antonio, TX (US); Manfred Amann, San Antonio, TX (US); Emily Margaret Gray, San Antonio, TX (US); Donnette Moncrief Brown, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/215,918

(22) Filed: Mar. 29, 2021

Related U.S. Application Data

(63) Continuation of application No. 16/528,544, filed on Jul. 31, 2019, now Pat. No. 10,964,192.

(60) Provisional application No. 62/773,906, filed on Nov. 30, 2018.

(51) Int. Cl.
| | |
|---|---|
| G08B 21/10 | (2006.01) |
| H04W 4/02 | (2018.01) |
| G01W 1/10 | (2006.01) |
| H04W 4/00 | (2018.01) |

(52) U.S. Cl.
CPC ............... *G08B 21/10* (2013.01); *G01W 1/10* (2013.01); *H04W 4/00* (2013.01); *H04W 4/02* (2013.01); *H04W 4/023* (2013.01)

(58) Field of Classification Search
CPC ................................. G08B 21/10; H04W 4/02
USPC ........................................................ 340/601
See application file for complete search history.

(56) References Cited

U.S. PATENT DOCUMENTS

| | | | |
|---|---|---|---|
| 6,574,561 B2 | 6/2003 | Alexander et al. | |
| 7,103,565 B1 | 9/2006 | Vaid | |
| 7,724,130 B2 | 5/2010 | Norstrom et al. | |
| 7,813,741 B2 | 10/2010 | Hendrey et al. | |
| 10,964,192 B1 * | 3/2021 | Lecocke | G06Q 10/0631 |
| 2002/0032644 A1 | 3/2002 | Corby et al. | |
| 2006/0015254 A1 * | 1/2006 | Smith | H04W 4/02 340/905 |

(Continued)

OTHER PUBLICATIONS

Office Action dated Jul. 20, 2022 in U.S. Appl. No. 16/528,530.

*Primary Examiner* — Kam Wan Ma
(74) *Attorney, Agent, or Firm* — Plumsea Law Group, LLC

(57) ABSTRACT

A disaster preparation system may include a system controller. The system controller may include a device processor; and a non-transitory computer readable medium including instructions executable by the device processor to perform the following steps: receiving location data from a personal electronic device of a user; receiving forecast data regarding a predicted disaster; making a determination of a preparatory action to be executed on behalf of the user, based on the location data and the forecast data; and executing the preparatory action at a predetermined time relative to the predicted time of occurrence of the predicted disaster.

20 Claims, 17 Drawing Sheets

(56) References Cited

U.S. PATENT DOCUMENTS

| | | |
|---|---|---|
| 2009/0247116 A1 | 10/2009 | Sennett et al. |
| 2011/0071880 A1 | 3/2011 | Spector |
| 2012/0028600 A1 | 2/2012 | Vallaire |
| 2012/0218102 A1 | 8/2012 | Bivens et al. |
| 2013/0030925 A1 | 1/2013 | Calman et al. |
| 2013/0117057 A1* | 5/2013 | Van Moltke ....... G01C 21/3415 705/7.13 |
| 2013/0211859 A1 | 8/2013 | Dent et al. |
| 2015/0039364 A1* | 2/2015 | Beraudier .............. G06Q 50/30 705/7.13 |
| 2016/0148490 A1 | 5/2016 | Barnes et al. |
| 2017/0161762 A1 | 6/2017 | Porth et al. |
| 2018/0365785 A1 | 12/2018 | Boss et al. |
| 2019/0026791 A1* | 1/2019 | Rai .................... G06Q 30/0279 |
| 2019/0095882 A1 | 3/2019 | Parker |
| 2020/0005295 A1 | 1/2020 | Murphy |

\* cited by examiner

PURCHASE HISTORY

| CATEGORY | ITEM | SO# | SHIPPED | QTY SHIPPED | PRICE |
|---|---|---|---|---|---|
| GROCERY ITEMS | | | | | |
| 1105 → | SOUP | 50066 | 11/03/2015 | 10 EA | 15.00 |
| | BOTTLED WATER | 50067 | 11/03/2015 | 24 EA | 5.00 |
| | CRACKERS | 50068 | 11/03/2015 | 2 EA | 8.00 |
| | CANNED BEANS | 50069 | 11/03/2015 | 5 EA | 7.50 |
| | CANNED PEACHES | 50070 | 11/03/2015 | 4 EA | 5.00 |
| | HAND SOAP | 50073 | 11/03/2015 | 1 EA | 2.50 |
| | | | TOTALS | 12 | $43.00 |
| ENERGY | | | | | |
| 1110 → | BATTERIES | 50075 | 11/09/2015 | 12 EA | 8.00 |
| | GENERATOR | 50076 | 11/09/2015 | 1 EA | 200.00 |
| | | | TOTALS | 13 | $208.00 |
| OTHER | | | | | |
| 1115 → | SANDBAGS | 50077 | 11/09/2015 | 10 EA | 50.00 |
| | PLYWOOD | 50078 | 11/09/2015 | 5 EA | 25.00 |
| | | | TOTALS | 15 | $75.00 |

FIG. 11

DISASTER PREPARATION SYSTEM

CROSS-REFERENCE TO RELATED APPLICATIONS

This application is a continuation of U.S. patent application Ser. No. 16/528,544, filed Jul. 31, 2019, and entitled "Disaster Preparation System," now U.S. Pat. No. 10,964,192, issued Mar. 30, 2021, which claims priority to U.S. Provisional Patent Application No. 62/773,906, filed Nov. 30, 2018, the entire disclosures of which are incorporated herein by reference.

TECHNICAL FIELD

The present disclosure generally relates to pre-disaster assistance systems and, more particularly, to a pre-disaster banking system, a pre-disaster preparatory action system, and a pre-disaster education system.

BACKGROUND

Prior to the occurrence of predicted disasters, such as hurricanes, tornados, floods, etc., there are various precautions that residents of the predicted disaster zone can take to avoid or better withstand the impending disaster. For example, residents subject to an impending disaster may prepare for a lack of availability of various resources, including, money, fuel, electricity, food, water, etc. In order to prepare for a predicted disaster, steps can be taken to prepare for this unavailability of certain resources. For example, in case banking systems and establishments become inoperable/inaccessible, a person may withdraw money to be used while the financial systems are down. However, in some cases, a person may not have the cash reserves in the bank from which to draw.

In some cases, steps can be taken to ensure availability of energy resources, such as fuel and electricity during a disaster. For example, ahead of a predicted disaster, people may purchase a gas-powered electric generator as well as fuel to power it. However, if a disaster approaches with little warning, or if these resources are hard to come by due to large numbers of people also preparing for their own survival, it may be difficult for people to obtain energy resources.

In some cases, it may be advisable for residents to evacuate the area where the disaster is predicted to occur. Further, since their homes may be subject to significant damage, it may be advisable for them to bring some or all of their belongings with them when they evacuate. However, residents do not always know when they should evacuate, or simply bunker down inside their homes. Further, they may not know how much of their belongings should be taken with them. For example, is mild flooding expected, so merely emptying their basement will be sufficient, or is a 20 foot storm surge expected to destroy their entire house? The residents may not know with specificity whether and to what extent the predicted disaster will affect them. General advisories may be provided for a geographic region, but residents may not have recommendations specific to their own situation. For example, a resident may live in a low-lying area, but their home may not be at as much risk for flooding as their neighbors because it may reside at a higher elevation or built on stilts.

There is a need in the art for systems and methods that address the shortcomings discussed above. In particular, there is a need in the art for pre-disaster banking, preparation, and education systems.

SUMMARY

In one aspect, the present disclosure is directed to a pre-disaster banking system, comprising: a system controller. The system controller may include a device processor; and a non-transitory computer readable medium including instructions executable by the device processor to perform the following steps: receiving location data from a personal electronic device of a user; receiving forecast data regarding a predicted disaster; making a determination of a banking transaction to be executed for the user, based on the location data and the forecast data; and executing the determined banking transaction at a predetermined time relative to the predicted time of occurrence of the predicted disaster.

In another aspect, the present disclosure is directed to a pre-disaster banking system, comprising: a system controller. The system controller may include a device processor; and a non-transitory computer readable medium including instructions executable by the device processor to perform the following steps: receiving location data from a personal electronic device of a user; receiving forecast data regarding a predicted disaster; and executing a cash advance to a bank account of the user, based on the location data and the forecast data.

In another aspect, the present disclosure is directed to a method for pre-disaster automated banking. The method may include receiving location data, with a system controller, from a personal electronic device of a user; receiving forecast data, with the system controller, regarding a predicted disaster; making a determination of a banking transaction to be executed for the user, based on the location data and the forecast data; and executing the determined banking transaction at a predetermined time relative to the predicted time of occurrence of the predicted disaster.

In another aspect, the present disclosure is directed to a disaster preparation system, comprising a system controller. The system controller may include a device processor; and a non-transitory computer readable medium including instructions executable by the device processor to perform the following steps: receiving location data from a personal electronic device of a user; receiving forecast data regarding a predicted disaster; making a determination of a preparatory action to be executed on behalf of the user, based on the location data and the forecast data; and executing the preparatory action at a predetermined time relative to the predicted time of occurrence of the predicted disaster.

In another aspect, the present disclosure is directed to a disaster preparation method. The method may include receiving location data, with a system controller, from a personal electronic device of a user; receiving forecast data, with a system controller, regarding a predicted disaster; making a determination of a preparatory action to be executed on behalf of the user, based on the location data and the forecast data; and executing the preparatory action at a predetermined time relative to the predicted time of occurrence of the predicted disaster.

In another aspect, the present disclosure is directed to a pre-disaster education system, comprising: a system controller. The controller may include a device processor; and a non-transitory computer readable medium including instructions executable by the device processor to perform the following steps: receiving location data from a personal electronic device of a user; receiving forecast data regarding a predicted disaster; making a determination of an educational message to be sent to the personal electronic device of the user, based on the location data and the forecast data; and sending the educational message to the personal electronic device of the user at a predetermined time relative to the predicted time of occurrence of the predicted disaster.

In another aspect, the present disclosure is directed to a pre-disaster education system, comprising: a system controller. The controller may include a device processor; and a non-transitory computer readable medium including instructions executable by the device processor to perform the following steps: receiving location data from a personal electronic device of a user; receiving forecast data regarding a predicted disaster; and sending an educational message to the personal electronic device of the user, based on the location data and the forecast data.

In another aspect, the present disclosure is directed to a method for pre-disaster education. The method may include receiving location data, with a system controller, from a personal electronic device of a user; receiving forecast data, with a system controller, regarding a predicted disaster; making a determination of an educational message to be sent to the personal electronic device of the user, based on the location data and the forecast data; and sending the educational message to the personal electronic device of the user at a predetermined time relative to the predicted time of occurrence of the predicted disaster.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 11 is a schematic illustration of a recent purchase history of a resident;

DESCRIPTION OF EMBODIMENTS

The disclosed pre-disaster assistance systems may include several features for assisting persons who are reside, or are otherwise located, in a predicted disaster area. For example, the disclosed systems may be configured to execute bank transactions on behalf of a user, perform a pre-disaster preparatory action, or deliver pre-disaster educational messages to the user. By providing such pre-disaster assistance, users may be better prepared to survive during and after a disaster. Alternatively, or additionally, such assistance may facilitate the preservation of the user's belongings and the integrity of their property, such as their homes. Further, such assistance, particularly educational messages, may assist residents to be better prepared by providing information about beneficial preparatory actions they can take and/or by providing information about preparatory actions that may be particularly beneficial for the immediate locality of the user's residence.

Pre-Disaster Banking System

In order to assist users to deal with the financial burdens of a disaster, a pre-disaster banking system may be configured to determine and perform banking transactions for users. For example, in some cases, the system may be configured to execute a cash advance for the user in order to help the user pay for precautionary action, preparatory purchases, and/or evacuation. In some cases, the cash advance may be executed in order to avoid missing a payroll deposit in the event the payroll system is at risk of becoming unavailable due to the effects of the disaster.

Figure 1:
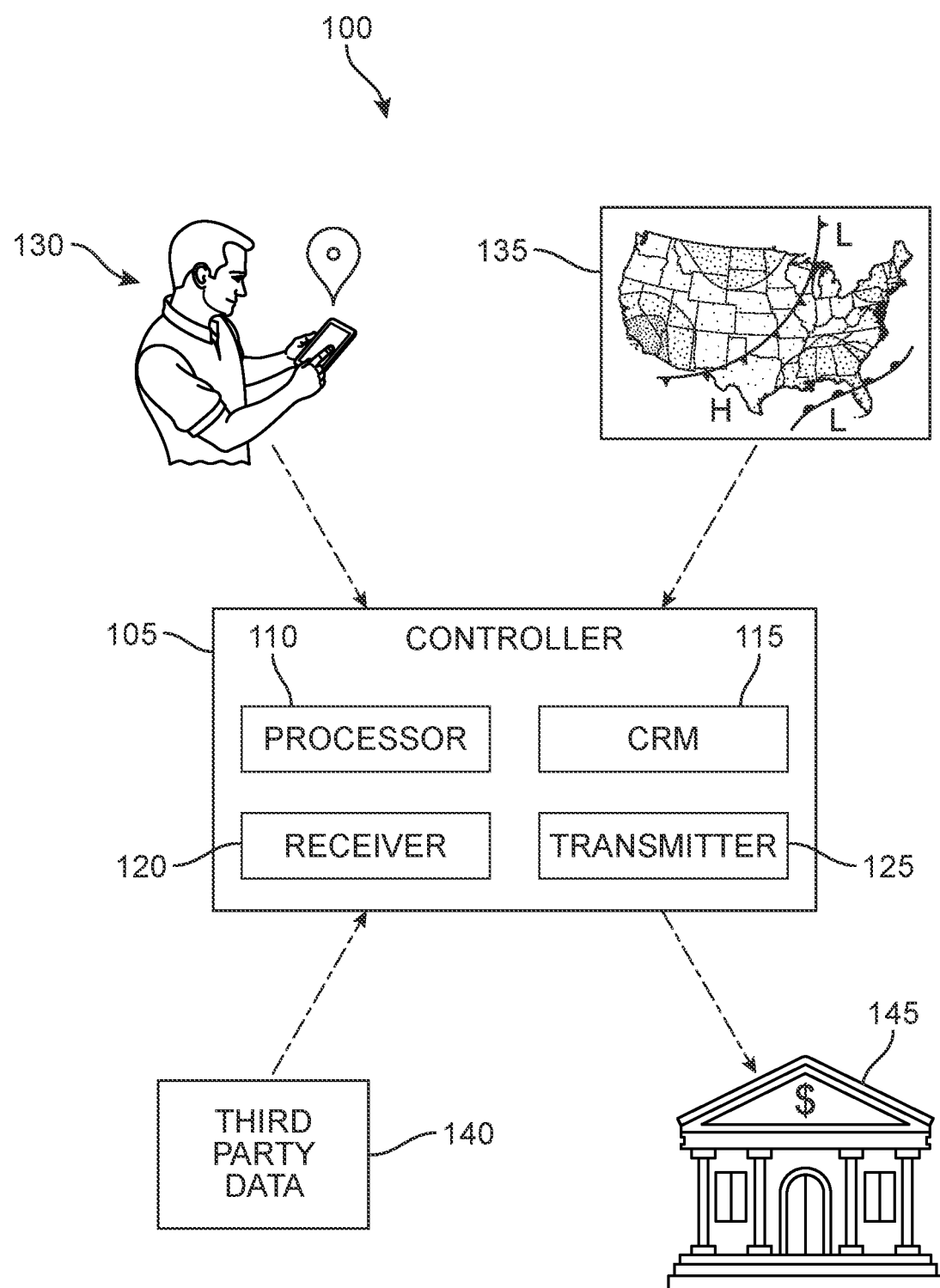
FIG. 1 is a schematic illustration of a pre-disaster banking system.

FIG. 1 is a schematic illustration of a pre-disaster banking system 100. As shown in FIG. 1, system 100 may include a system controller 105. Controller 105 may include various computing and communications hardware, such as servers, integrated circuits, displays, etc. Further, controller 105 may include a device processor 110 and a non-transitory computer readable medium 115 including instructions executable by device processor 110 to perform the processes discussed herein. The components of controller 105 may be implemented in association with a mobile conditions monitoring center, such as vehicle, or in association with a control center or conditions monitoring center located in a permanent building (i.e., a brick and mortar establishment).

The non-transitory computer readable medium may include any suitable computer readable medium, such as a memory, e.g., RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, a read-only memory (ROM), a random access memory (RAM), a static random access memory (SRAM), a portable compact disc read-only memory (CD-ROM), an erasable programmable read-only memory (EPROM or Flash memory), a digital versatile disk (DVD), a memory stick, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Controller 105 may include networking hardware configured to interface with other nodes of a network, such as a LAN, WLAN, or other networks. In Further, controller 105 may be configured to receive data from a plurality of sources and communicate information to one or more external destinations. Accordingly, controller 105 may include a receiver 120 and a transmitter 125. (It will be appreciated that, in some embodiments, the receiver and transmitter may be combined in a transceiver.)

Any suitable communication platforms and/or protocols may be utilized for communication between controller 105 and other components of the system. Since the various sources of information may each have their own platform and/or protocol, system 100 may be configured to interface with each platform and/or protocol to receive the data.

The computer readable medium may include instructions executable by the device processor to perform steps including receiving location data from a personal electronic device of a user 130. User 130 is shown holding a personal electronic device such as a smart phone. However, the personal electronic device from which location data is received may be any type of personal electronic device for which the location may be tracked. Exemplary alternatives include stationary devices, such as desktop computers; portable computing devices, such as tablets and laptops; and wearable technology, such as smart watches, fitness trackers, etc. These personal electronic devices may have similar components as controller 105. For example, the personal electronic devices may include a device processor and non-transitory computer readable medium containing instructions executable by the processor. Such devices may also include a receiver, transmitter, transceiver, or other communication equipment. Skilled artisans will readily recognize suitable features and specifications for such personal electronic devices for use with the disclosed system.

In addition, the computer readable medium may include instructions for receiving forecast data regarding a predicted disaster, which is illustrated by a weather map 135. Although forecast data regarding a predicted disaster is represented by a weather map, it will be understood that forecast data regarding a predicted disaster may be any type of information regarding predicted disasters that may be considered by controller 105 in determining how to assist the users who are potentially affected by the impending disaster. Accordingly, while the disaster may include weather disasters, such as hurricanes, tornadoes, snow storms, etc., in some cases, non-weather based disasters may be considered by the system. For example, forest fires, war zones, acts of terrorism, etc. may be considered by the system.

Further, the computer readable medium may include instructions for making a determination of a banking transaction to be executed involving a bank account of the user, based on the location data and the forecast data received by the controller. Also, the computer readable medium may include instructions for executing the determined banking transaction at a predetermined time relative to the predicted time of occurrence of the predicted disaster.

In FIG. 1, the execution of the banking transaction is indicated by a bank 145. The banking transaction may be any transaction executed on behalf of, or otherwise for the benefit of, the user whose personal electronic device is tracked for consideration by controller 105. For example, in some embodiments, the banking transaction may include a cash advance performed prior to a regularly scheduled payroll deposit. That is, if the user receives regular payroll deposits into their account, but the next deposit is scheduled for a time period during or following a predicted disaster, system 100 may issue a cash advance to the user prior to the scheduled deposit. The cash advance may enable the user to purchase various supplies to prepare for or evacuate from an impending disaster.

Accordingly, in some embodiments, computer readable medium 115 may further include instructions for receiving data from one or more third parties and basing the determination of a banking transaction to be executed, at least in part, on the third party data. Exemplary third party data 140 may include information regarding the user's pay. Accordingly, in some embodiments, the one or more third parties from which data may be received may include an employer payroll organization of the user. The payroll organization may be the user's employer, or an independent payroll service.

The amount of the cash advance may be determined based on a number of factors including, for example, the number of family members living with the user, the severity of the predicted disaster, whether the user is recommended to evacuate the residence or simply bunker down in place, how much fuel the user will need to evacuate, etc. In some embodiments, this information may be provided by the user at the time of registration with system 100. The registration process is discussed in greater detail below with respect to FIG. 3. This information could be received from other third parties, such as weather services, disaster response organizations, first responders (e.g., fire department, police department, coast guard, etc.), and any other organization that may provide information that would enable a more informed determination as to an amount of cash needed by the user ahead of the disaster.

It will be understood that the initial determination of the bank transaction may be based on the amount of time remaining until the disaster when the initial determination is made. The forecast may provide a longer or shorter lead time before the disaster occurs. Also, a user may register with the pre-disaster assistance system well ahead of a predicted disaster, or shortly before the disclosed disaster. Accordingly, the amount of time remaining before the predicted occurrence of the disaster is considered when determining what the pre-disaster assistance is to be.

Also, as the amount of time remaining reduces, the determined assistance to be provided may change. Accordingly, in some embodiments, the computer readable medium may further include instructions for, prior to executing the banking transaction, changing the determination of the banking transaction to be executed based on a change in the location data received from the personal electronic device of the user or based on a change in the forecast data received regarding the predicted disaster. For example, if the banking transaction is determined by the controller and scheduled to be made 72 hours before the disaster is forecast to begin, but 84 hours prior to the predicted disaster the forecast changes, the system may change the determined banking transaction. For instance, if the initial forecast called for a very severe storm, and recommendations were for the local residents to evacuate the area, the initial determination may have been for a relatively high cash advance amount, particularly given the user's need for fuel to make the evacuation. If the forecast changes, and the storm is not predicted to be as severe in the user's locality, and evacuation is no longer recommended, the amount of the cash advance to be made may be reduced. The opposite change may also be made. That is, if the forecast changes to a more severe disaster, the cash advance amount to be made may be increased instead of decreased.

In addition, the computer readable medium may further include instructions for receiving purchase data regarding purchases made by the user within a predetermined period of time prior to the making of the determination of the banking transaction to be executed, and basing the determination, at least in part, on the received purchase data. For example, as shown and discussed in greater detail below with respect to FIGS. 11 and 12, a user's purchase history may be tracked, and a customized pre-disaster purchase order may be generated on behalf of the user to send the user various items that have been determined to be beneficial to the user's situation but not identified in the user's recent purchase history. The amount of the cash advance may be determined, at least in part, on the user's recent purchase history. In order to effectuate this purchase tracking, the user may register a credit card in the system, and authorize the system to be granted access to the user's purchase records using that credit card. In some cases, the system itself may be operated by, or otherwise associated with, a financial institution, and thus, the financial institution may have access to the user's purchase history using the financial institution's own credit card or debit card.

Also, in some embodiments, computer readable medium 115 may further include instructions for, based on the pre-disaster circumstances, changing a security protocol for executing the banking transaction. For example, in some cases, the security protocol(s) for executing the pre-disaster banking transaction may be relaxed when compared to the standard security protocols required by the user's bank. For instance, in some cases, if the bank typically requires a two pronged identification protocol (e.g., pass code and fingerprint), the pre-disaster transaction may be executable with only one type of identification (e.g., only the thumbprint). It may be more difficult to provide certain security identification during the time of a disaster. For example, if a user is in a hurry to prepare for the impending disaster, they may not have time to find a seldom used security pass code. Accordingly, the system may merely require the user's fingerprint. In some cases, security protocols may be satisfied through the system registration process in order to enable less rigorous security protocols to be implemented to approve execution of the actual banking transaction.

Figure 2:
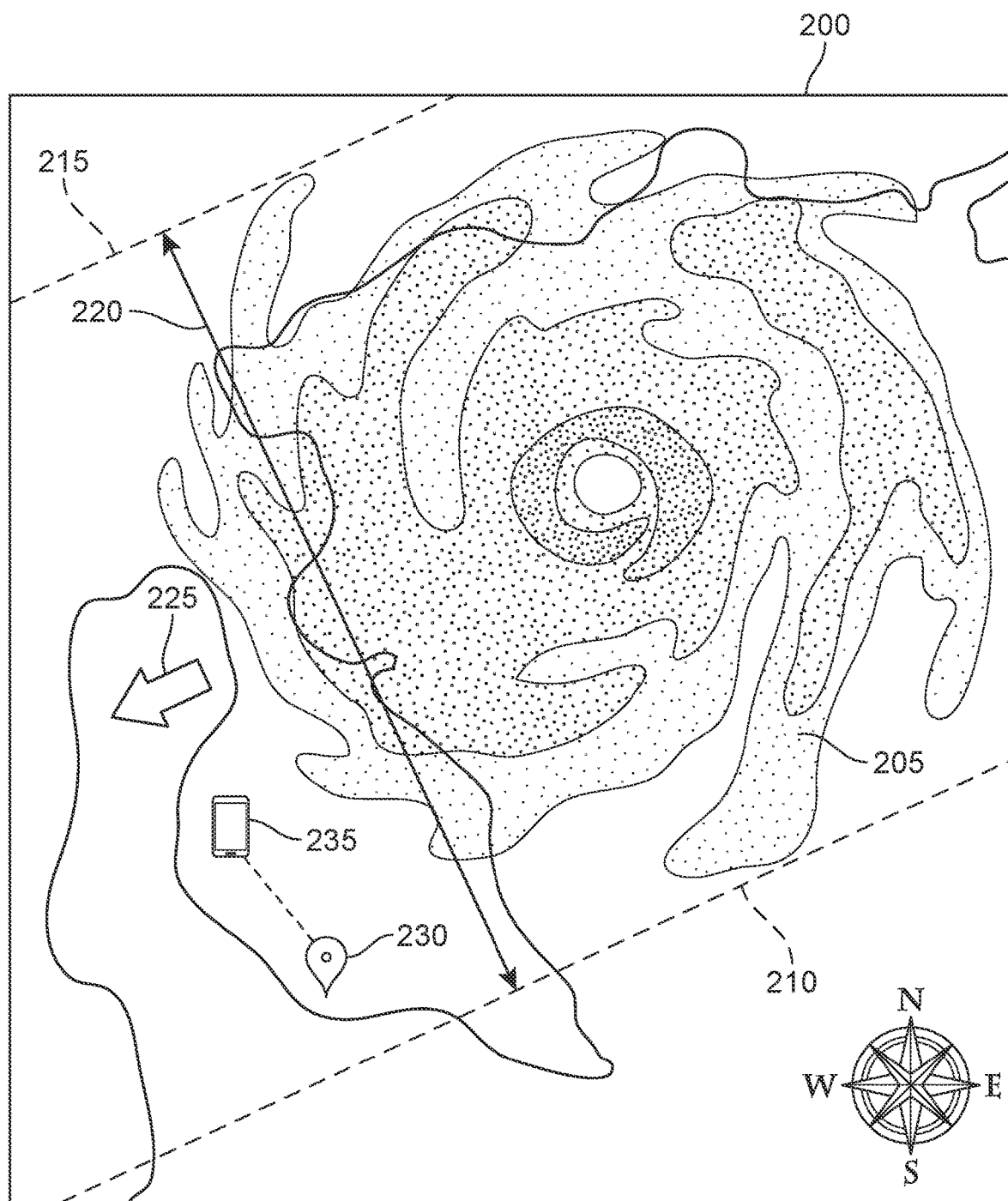
FIG. 2 is a schematic illustration of a map showing a location of a personal electronic device in a geographic region within a predicted disaster zone.

FIG. 2 is a schematic illustration of a map showing a location of a personal electronic device in a geographic region within a predicted disaster zone. FIG. 2 shows, schematically, an example of how the disclosed system considers the location of a user with respect to a predicted disaster zone. As shown in FIG. 2, a map 200 illustrates a hurricane 205 having a first side 210 and a second side 215 opposite the first side defining a storm width 220 as hurricane 205 proceeds in a direction indicated by an arrow 225. Accordingly, a predicted path of the hurricane includes the geographic area in the direction of arrow 225 with respect to the current position of hurricane 205, and having a width approximating storm width 215. A pin location 230 of a personal electronic device 235 indicates a user device being located in the predicted path of hurricane 205.

The location of the user device within the predicted path is considered in determining the type and magnitude of assistance to be provided to the user. For example, the proximity of pin location 230 to first side 210 of the storm path will determine how far a user needs to travel to evacuate, which will determine, for example, how much fuel will be needed to drive the required evacuation distance.

Figure 3:
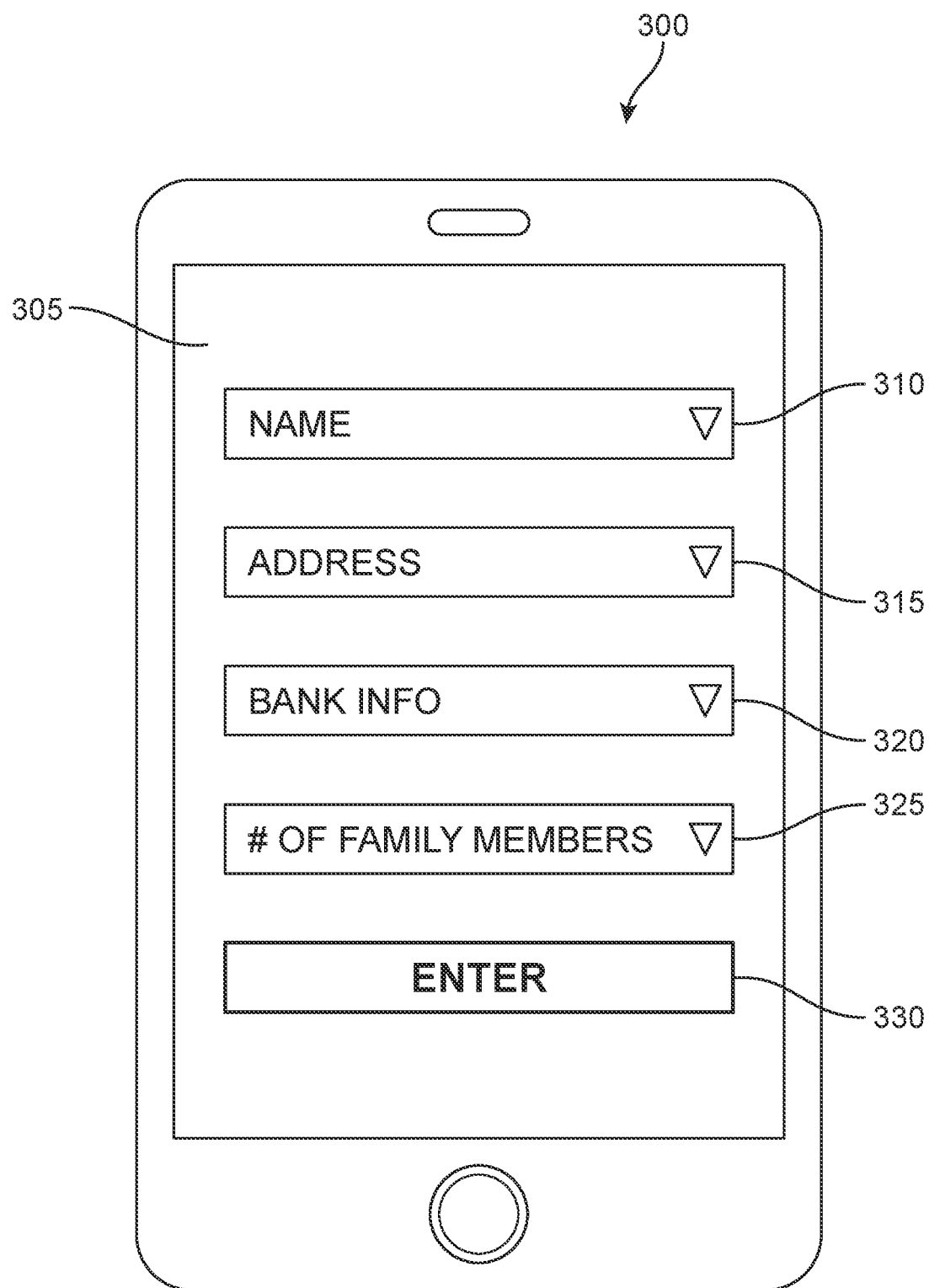
FIG. 3 is a schematic illustration of a registration interface for the pre-disaster banking system.

FIG. 3 is a schematic illustration of a registration interface for the pre-disaster banking system. FIG. 3 shows a personal electronic device 300 having a graphical user interface 305. Displayed on interface 305 are the menus of an application configured to enable a user to register with a pre-disaster assistance system. Accordingly, device 300 may include a device processor and a non-transitory computer readable medium storing instructions that are executable by the device processor. The features and specifications of these components may be similar to the device processor and non-transitory computer readable medium discussed above.

As shown in FIG. 3, a first field 310 may enable a user to enter their name. Also, a second field 315 may enable a user to enter their address information. In addition, at a third field 320, the user may enter information regarding the bank account to which they would like a cash advance to be issued in the event of a disaster. Further, the registration system may enable the user to enter various additional pieces of personal information that may be relevant to the determination of the type and magnitude of assistance required by the user in the event of a disaster. For example, as shown in FIG. 3 at field 325, the user may enter the number of family members that reside at the user's residence. Other exemplary information which may be input into the registration system may include the ages of the family members, any health conditions the family members may have, the types of vehicles driven by the members in the household, etc. Once all relevant information has been provided, the user may finalize their registration, for example, by pressing an "ENTER" button 330. These and other types of information may be considered by the system in determining the type and magnitude of assistance provided to the user.

Figure 4:
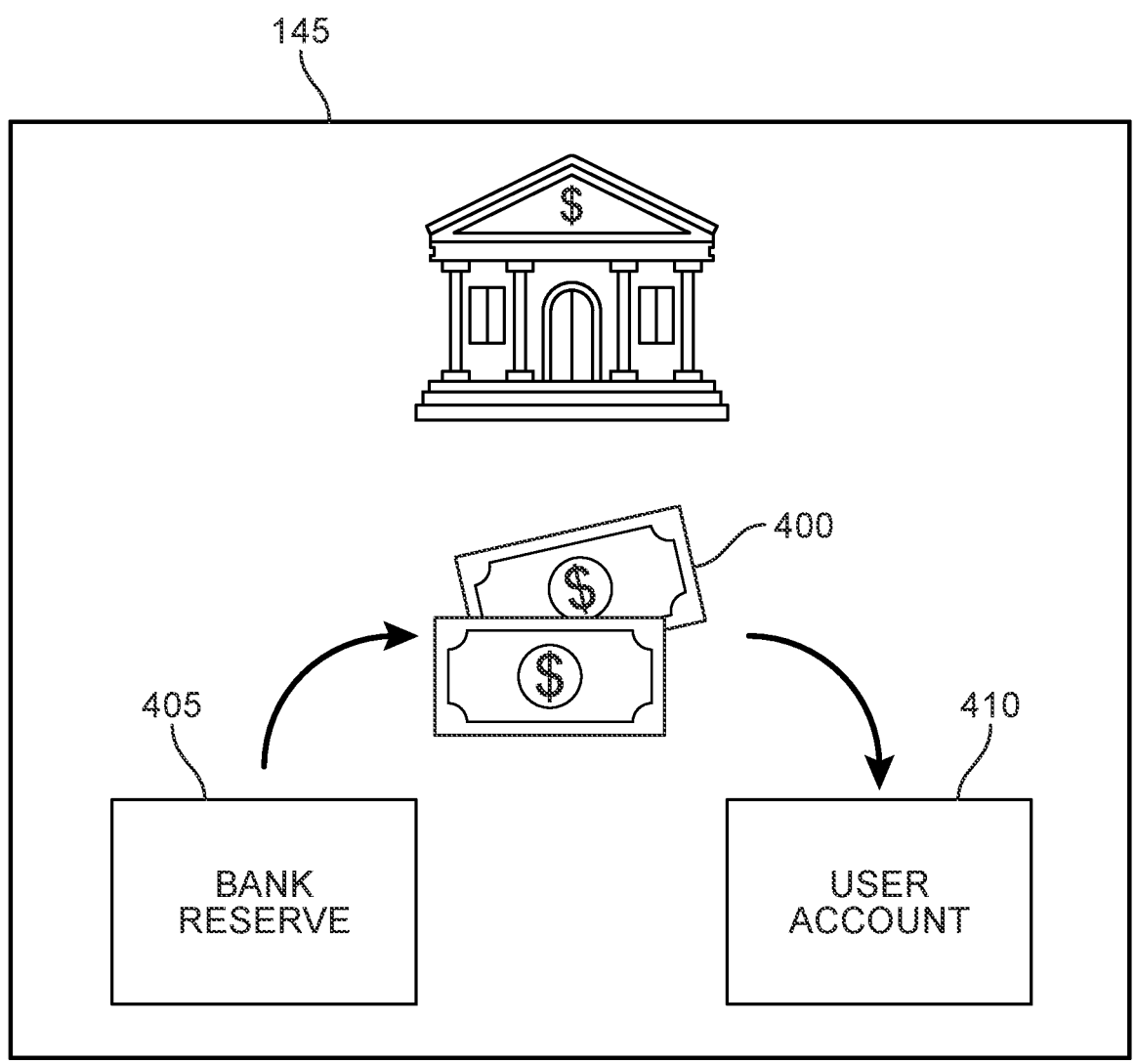
FIG. 4 is a schematic illustration of a pre-disaster banking transaction.

FIG. 4 is a schematic illustration of a pre-disaster banking transaction. As shown in FIG. 4, in some embodiments, the banking transaction may be executed at bank 145 by transferring a determined amount of cash 400 from a bank reserve 405 to the user's account 410. This type of transaction is intended to be exemplary. Those having ordinary skill in the art will readily recognize other ways in which a cash advance may be provided to the user. For example, in some cases, the cash may not necessarily be transferred to the user, but rather made available for the user to withdraw directly from the bank reserve. In such a case, the cash advance may be distributed directly to the user, e.g., at a branch or automated teller machine (ATM), without the cash ever having been deposited in the user's own account. In some cases, the money may be transferred from another source other than the bank's own reserve. For example, in some embodiments, the cash may be advanced by the user's employer or payroll service, thus eliminating the risk to the bank in essentially lending the user cash temporarily until the next payroll deposit is completed. Further, other types of transactions may be executed other than a cash advance. For example, in some cases, money may be transferred from one of the user's own accounts to a different account of the user. For instance, the banking transaction may involve pulling money out of a retirement fund, stocks, or other investment fund and transferring it to the user's savings or checking account for more immediate access. In some cases, the banking transaction may include transferring a pre-disaster settlement, or partial settlement, from an insurance company.

Figure 5:
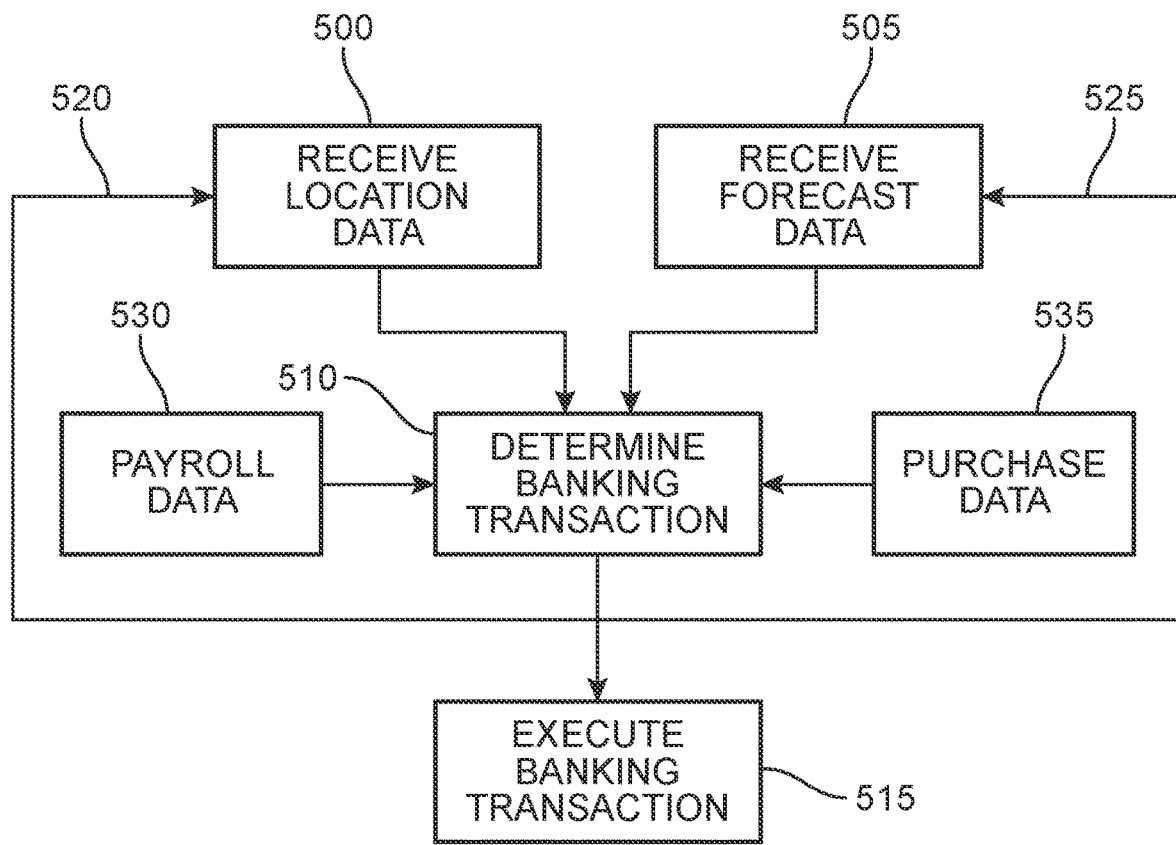
FIG. 5 is a flowchart illustrating a process of determining a pre-disaster banking transaction to be made and executing the transaction.

FIG. 5 is a flowchart illustrating a process of determining a pre-disaster banking transaction to be made and executing the transaction. As illustrated in FIG. 5, the computer readable medium may include instructions for receiving location data (step 500), with a system controller, from a personal electronic device of a user. In addition, the computer readable medium may include instructions for receiving forecast data (step 505), with the system controller, regarding a predicted disaster. Further, the computer readable medium may include instructions for making a determination of a banking transaction to be executed involving a bank account of the user (step 510), based on the location data and the forecast data. Also, the computer readable medium may include instructions for executing the determined banking transaction (step 515) at a predetermined time relative to the predicted time of occurrence of the predicted disaster.

As also shown in FIG. 5, the method may further include, prior to executing the banking transaction, changing the determination of the banking transaction to be executed based on a change in the location data received from the personal electronic device of the user or based on a change in the forecast data received regarding the predicted disaster. Accordingly, once the banking transaction has been determined at step 510, but prior to executing the banking transaction at step 515, the system may again consider (or continuously reconsider) any newly received location data via a logic loop 520 which returns the method to step 500. Upon considering any changes in the received location data, the determination of the banking transaction may change. For example, if the user's device is detected to now be outside of the predicted disaster zone, it may be concluded that the user is now out of the area, and thus, does not need assistance with evacuation. Similarly, the system may also again consider (or reconsider) any updated forecast data regarding an impending disaster, and change the determination of the banking transaction to be executed. For example, if the strength of the hurricane is forecast to be weaker than previously predicted, the amount of the cash advance to be provided may be reduced. Conversely, if the storm is forecast to be stronger than previously predicted, a larger cash advance may be provided.

It will also be noted that, the severity of the predicted disaster may not necessarily be directly proportional to the amount of the cash advance. For example, if a storm is weaker, the initial determination may be to provide a cash advance in an amount that may enable the user to purchase food for the entire family for a week. If the forecast changes and the storm is subsequently forecast to be stronger, the new determination for a cash advance may provide for evacuation. In such case, the amount of cash needed for the evacuation may be less than that needed to obtain food and supplies for a week. In some cases it may be greater, but not necessarily.

Further, the system may be configured to consider various factors, such as costs, when recommending precautions and providing assistance. For example, in some cases, the system may weigh whether bunkering at home or evacuating would be more expensive, and may opt to recommend and facilitate whichever is less expensive. Accordingly, if the system determines that evacuation would be less expensive, the system may determine a lesser amount for a cash advance, and may advise the user of the recommendation for less expensive precautionary action.

Disaster Preparation System

There are a number of precautionary steps that residents may take in order to prepare for an impending disaster. For example, in some cases, it may be advisable to move some or all of the user's belongings, temporarily or permanently, in order to avoid damage or loss due to a disaster. Other types of preparatory action may include purchasing supplies, such as groceries (e.g., non-perishable food items, water, etc.), energy provisions (e.g., batteries, electric power generators, phone chargers, etc.), home protection items (e.g., sandbags, plywood to board up windows, etc.), and/or first aid supplies. Further, preparatory actions may include preparing one's property to withstand a predicted disaster. For example, if floodwaters are anticipated, sandbags may be placed to protect one's home. Similarly, if high winds are predicted, windows may be covered with boards. The disclosed disaster preparation system may be configured to coordinate the provision of such preparatory action for users based on various monitored data.

Figure 6:
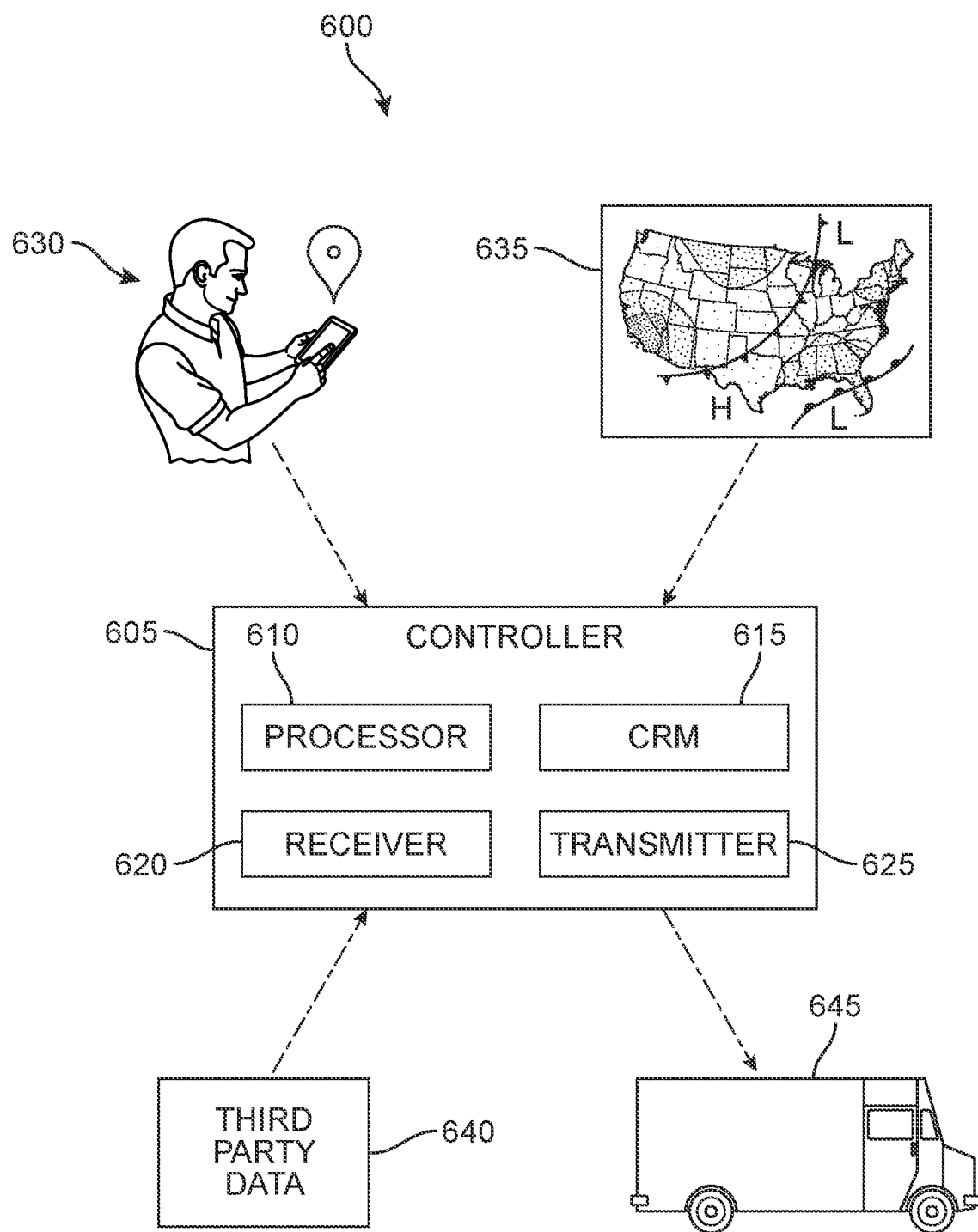
FIG. 6 is a schematic illustration of a disaster preparation system.

FIG. 6 is a schematic illustration of a disaster preparation system 600. As shown in FIG. 6, system 600 may include a system controller 605. Controller 605 may include various computing and communications hardware, such as servers, integrated circuits, displays, etc. Further, controller 605 may include a device processor 610 and a non-transitory computer readable medium 615 including instructions executable by device processor 610 to perform the processes discussed herein. The components of controller 605 may be implemented in association with a mobile conditions monitoring center, such as vehicle, or in association with a control center or conditions monitoring center located in a permanent building (i.e., a brick and mortar establishment). Controller 605 and its components may have the same or similar features as controller 105 and its components discussed above.

Also, similar to system 100 above, system 600 may be configured to receive location data (630) regarding a user's device, as well as forecast data (635) regarding a predicted disaster. Further, computer readable medium 615 may include instructions for making a determination of a preparatory action to be executed on behalf of the user, based on the location data and the forecast data; and executing the preparatory action at a predetermined time relative to the predicted time of occurrence of the predicted disaster. For example, the system may be configured to dispatch a vehicle 645. In some embodiments, vehicle 645 may be a hauling vehicle to assist with the moving of the user's belongings. For example, in some cases, the preparatory action may include coordinating an order of a moving service to move belongings of the user. In some embodiments, vehicle 645 may be a shipping vehicle configured to deliver items from a pre-disaster order. It will be noted that other types of pre-disaster preparatory action may be taken that does not necessarily involve a vehicle. However, the dispatch of vehicle 645 is utilized to represent the execution of preparatory actions generally.

It will be understood that the initial determination of the preparatory action may be based on the amount of time remaining until the disaster when the initial determination is made. The forecast may provide a longer or shorter lead time before the disaster occurs. Also, a user may register with the pre-disaster assistance system well ahead of a predicted disaster, or shortly before the disclosed disaster. Accordingly, the amount of time remaining before the predicted occurrence of the disaster is considered when determining what the pre-disaster assistance is to be.

Also, as the amount of time remaining before the predicted occurrence of a disaster reduces, the determined assistance to be provided may change. Accordingly, in some embodiments, the computer readable medium may further include instructions for, prior to executing the preparatory action, changing the determination of the preparatory action to be executed based on a change in the location data received from the personal electronic device of the user or based on a change in the forecast data received regarding the predicted disaster. For example, if the preparatory action is determined by the controller and scheduled to be made 72 hours before the disaster is forecast to begin, but 84 hours prior to the predicted disaster the forecast changes, the system may change the determined preparatory action. For instance, if the initial forecast called for a very severe storm, and recommendations were for the local residents to evacuate the area, the initial determination may have been for a relatively substantial preparatory action (e.g., it may be recommended to move all or substantially all of the user's belongings from their residence). If the forecast changes, and the storm is not predicted to be as severe in the user's locality, the recommended preparatory action may be less substantial (e.g., it may be recommended to move only belongings from the basement level to avoid minor flooding) . The opposite change may also be made. That is, if the forecast changes to a more severe disaster, the preparatory action to be made may be changed to be more substantial instead of less substantial.

In some embodiments, computer readable medium 615 may further include instructions for receiving data from one or more third parties (640). Exemplary third party information may include the availability of storage space into which the user's belongings may be moved. For example, a storage facility may maintain a database indicating the amount of vacancy they have and the sizes of each vacant unit. This information may be receivable by system 600 in order to be considered when determining how much of the user's belongings are to be moved.

Figure 7:
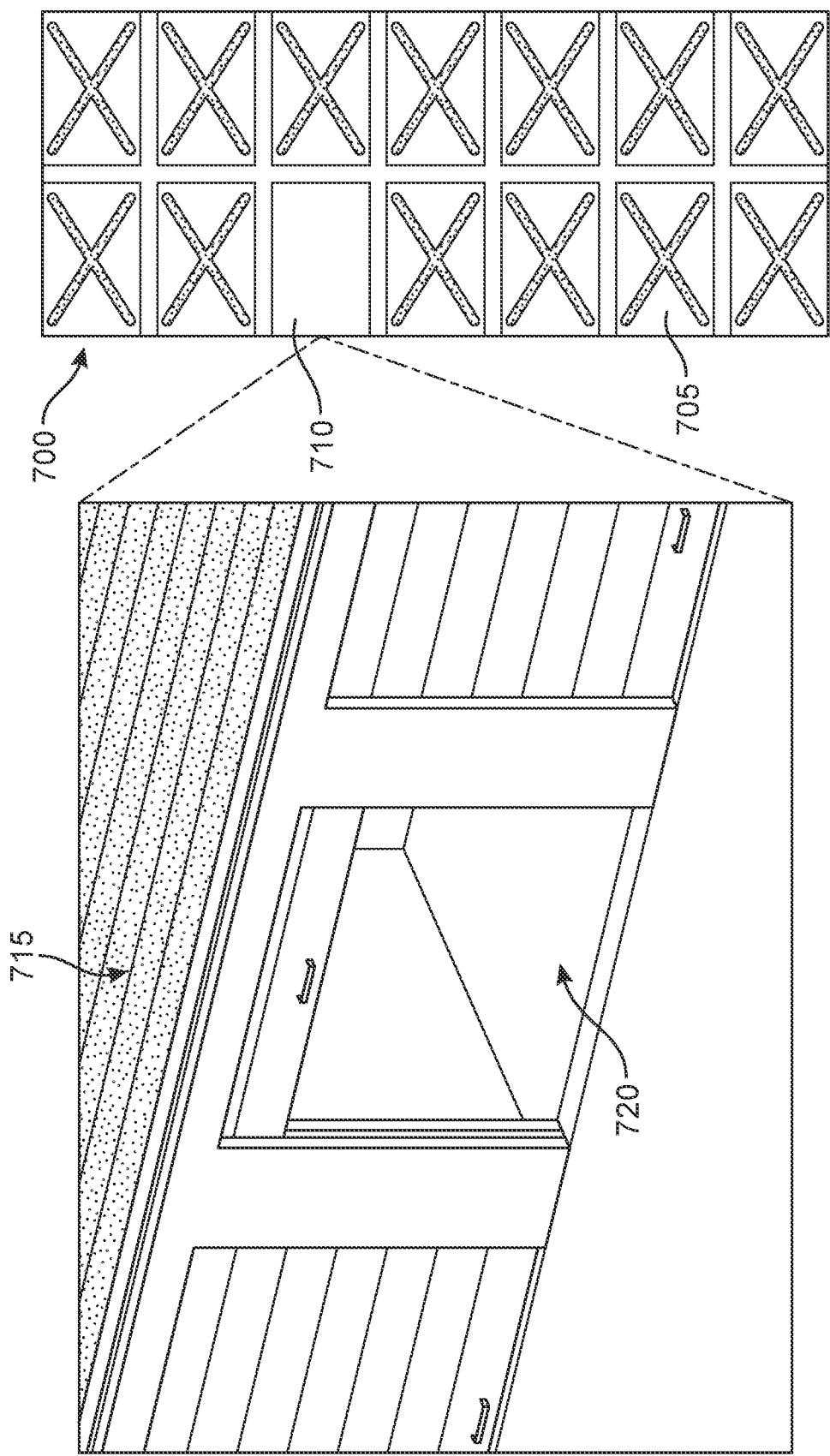
FIG. 7 is a schematic illustration of storage facility vacancy information.

FIG. 7 is a schematic illustration of storage facility vacancy information. Graphic 700 illustrates a floorplan view of a plurality of storage units at a storage facility. Occupied storage units 705 are indicated with an "X," whereas vacant units 710 are blank. An image of a storage facility 715 and a vacant unit 720 are also shown for reference. It will be understood that FIG. 7 is intended to represent storage vacancy data generally, and that information regarding storage vacancy may be received in any suitable form. For example, the system may simply receive the number of units and the size of each unit. No graphical representation need necessarily be communicated. However, in some embodiments, the graphical representation may be provided for user selection and reservation of a particular storage unit.

Accordingly, the data received from one or more third parties may include vacancy data from a storage facility. Further, the preparatory action may include coordinating an order of a moving service to move belongings of the user. Also, it will be understood that, in some embodiments, coordinating the order of the moving service may include determining a size of a moving vehicle based, at least in part, on the vacancy data.

Figure 8:
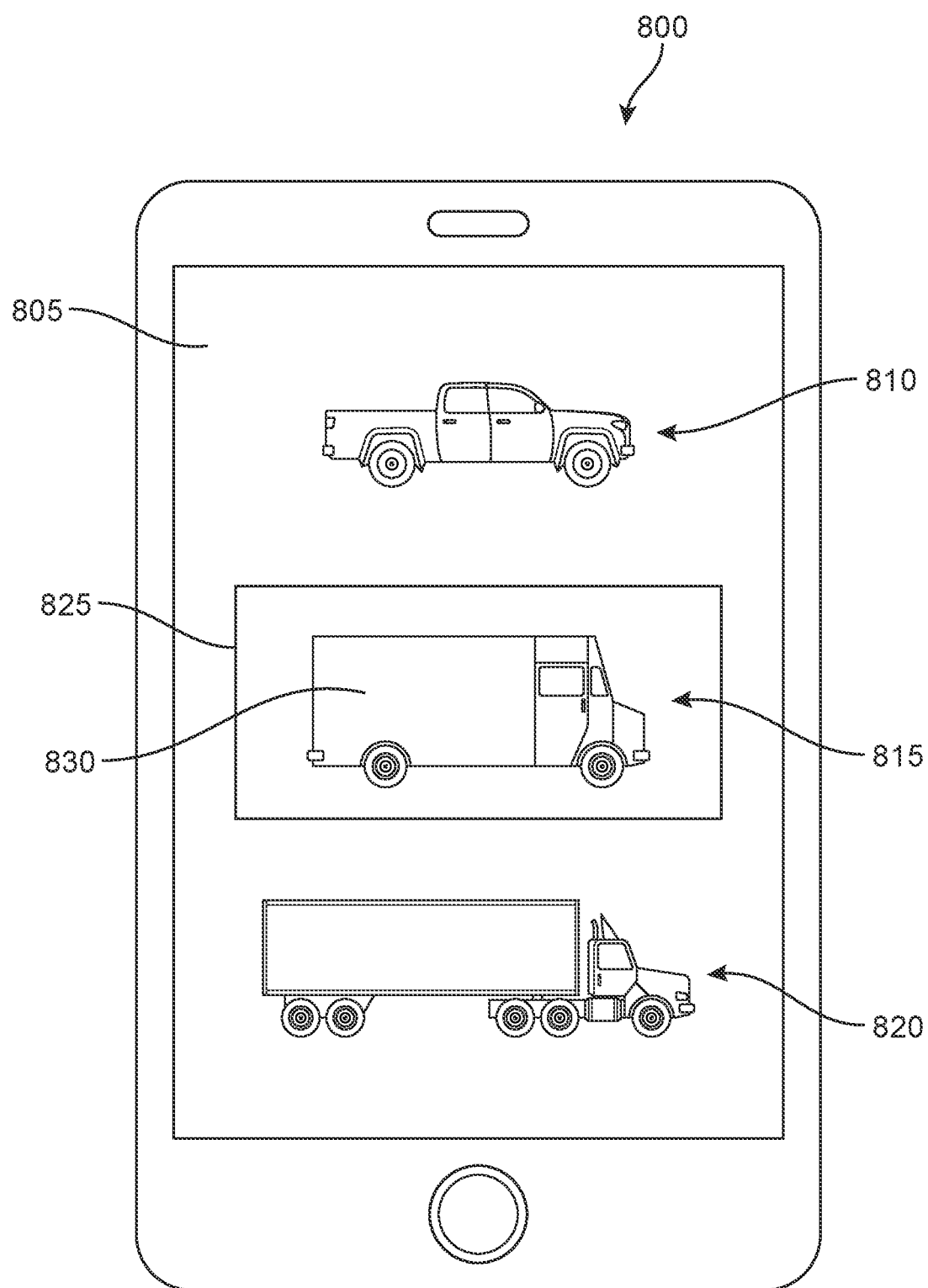
FIG. 8 is a schematic illustration of a hauling vehicle recommendation interface.

FIG. 8 is a schematic illustration of a hauling vehicle recommendation interface. FIG. 8 shows a personal electronic device 800 having a graphical user interface 805. Displayed on interface 805 are images of an application configured to facilitate dispatch of a hauling vehicle to move the belongings of a user. Device 800 may include a device processor and a non-transitory computer readable medium storing instructions that are executable by the device processor. The features and specifications of these components may be similar to the device processor and non-transitory computer readable medium discussed above.

As shown in FIG. 8, coordinating the order of the moving service may include determining a size of a moving vehicle. In some cases, the vehicle size may be determined based on an amount of belongings indicated by the user. In some cases, the vehicle size may be determined based on an amount of time remaining prior to the predicted disaster.

FIG. 8 illustrates three different types of hauling vehicles, each having a different size. A first hauling vehicle 810 is represented as a pickup truck, which may move a relatively smaller amount of the user's belongings. A second hauling vehicle 815 is represented as a panel van, which may be configured to move a larger amount of the user's belongings. A third hauling vehicle 820 is represented as a tractor-trailer (semi) truck, and may be configured to move an even larger amount of the user's belongings. A box 825 identifies a mid-sized hauling vehicle 830. This box may be provided as a recommendation based on the system's analysis, or may be selectable by the user to choose a type of hauling vehicle. That is, in some cases, this type of display may be displayed to the user to indicate which type of vehicle is being dispatched to their location. In some cases, this type of imagery may be displayed to provide the user with a choice as to which type of vehicle is to be sent. In some embodiments, the display may default to a recommended/determined vehicle size, and the user may be given the opportunity to confirm the recommended size or select a different size before the preparatory act is executed by dispatching the selected vehicle.

Figure 9:
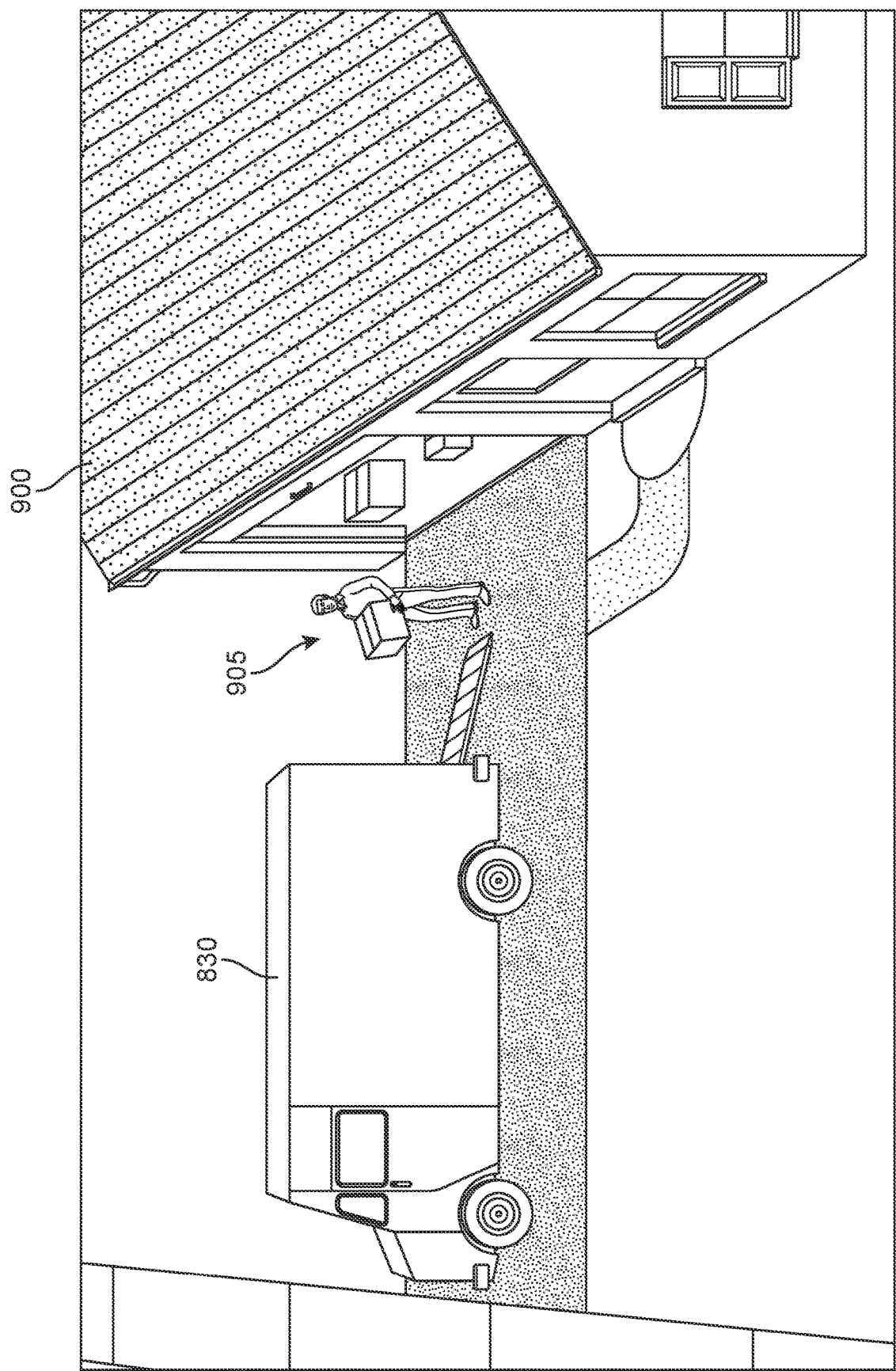
FIG. 9 is a schematic illustration of a hauling vehicle provided to assist a resident move their belongings ahead of a predicted disaster.

FIG. 9 is a schematic illustration of a hauling vehicle provided to assist a resident move their belongings ahead of a predicted disaster. Specifically, FIG. 9 illustrates mid-sized hauling vehicle 830 having been dispatched to a residence 900 of a user. Accordingly, the user or an employee or volunteer associated with the moving service may move at least some of the user's belongings into vehicle 830 for transport to a safe location. In FIG. 9, a person 905 is illustrated carrying a box of the user's belongings to represent this process.

Figure 10:
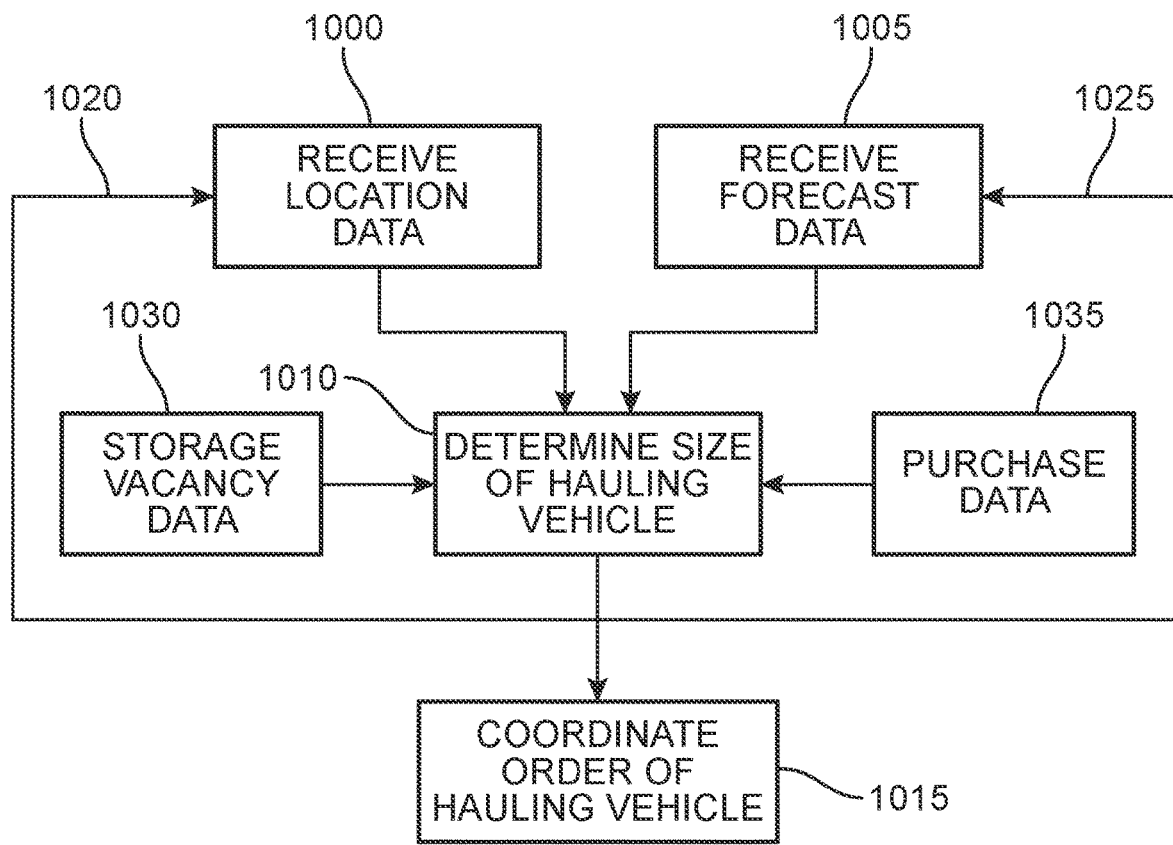
FIG. 10 is a flowchart illustrating process of determining a size of a hauling vehicle needed for a resident's belongings.

FIG. 10 is a flowchart illustrating process of determining a size of a hauling vehicle needed for a resident's belongings. As illustrated in FIG. 10, the computer readable medium may include instructions for receiving location data (step 1000), with a system controller, from a personal electronic device of a user. In addition, the computer readable medium may include instructions for receiving forecast data (step 1005), with the system controller, regarding a predicted disaster. Further, the computer readable medium may include instructions for making a determination of a hauling vehicle size (step 1010), based on the location data and the forecast data. Also, the computer readable medium may include instructions for coordinating an order of a hauling vehicle of the determined size (step 1015) at a predetermined time relative to the predicted time of occurrence of the predicted disaster.

As also shown in FIG. 10, the method may further include, prior to dispatching the hauling vehicle, changing the determination of the vehicle size based on a change in the location data received from the personal electronic device of the user or based on a change in the forecast data received regarding the predicted disaster. Accordingly, once the needed vehicle size has been determined at step 1010, but prior to coordinating the order of the vehicle at step 1015, the system may again consider (or continuously reconsider) any newly received location data via a logic loop 1020 which returns the method to step 1000. Upon considering any changes in the received location data, the determination of the vehicle size may change. For example, if the user's device is detected to now be outside of the predicted disaster zone, it may be concluded that the user is now out of the area, and thus, fewer of the user's belongings need to be moved. Similarly, the system may also again consider (or reconsider) any updated forecast data regarding an impending disaster, and change the determination of the vehicle size accordingly. For example, if the strength of the hurricane is forecast to be weaker than previously predicted, the size of the hauling vehicle to be provided may be reduced. Conversely, if the storm is forecast to be stronger than previously predicted, a larger vehicle may be provided in order to move more of the user's belongings.

In addition, the computer readable medium of the system may include instructions for receiving data from one or more third parties. For example, in FIG. 10, the system may be configured to receive storage vacancy data 1030 from a storage facility. In such cases, the preparatory action may include coordinating an order of a moving service to move belongings of the user, including determining a size of a moving vehicle based, at least in part, on the vacancy data.

In some embodiments, the preparatory action may include coordinating an order for a delivery of one or more supplies to the user. Such supplies may be selected from the group including food items, home protection items, tools, fuel, electrical generation equipment, and batteries. In order to minimize the duplication of items when providing the user with supplies, the system may receive purchase data 1035 regarding purchases made by the user within a predetermined period of time prior to the making of the determination of the preparatory action to be executed. The system may then base the determination of which supplies to be sent to the user, at least in part, on the received purchase data. Any supplies that were purchased recently by the user may be omitted from the pre-disaster purchase order.

In some embodiments, the preparatory action taken by the system may include coordinating an order for a delivery of one or more supplies to the user. Rather than sending a standard care package of items to every user, the disclosed system may be configured to assess a user's readiness and send a customized pre-disaster order of supplies tailored specifically to the individual user's needs. In order to do so, in some embodiments, the system may track the recent purchase history of the user to assess whether certain disaster preparation items have been purchased recently.

FIG. 11 is a schematic illustration of a recent purchase history of a resident. An exemplary purchase history report 1100 illustrates the various types of items relevant to disaster preparation. For example, report 1100 illustrates these supplies in several categories, including for example, food or grocery items 1105, energy resource items 1110, and "other" items 1115. Grocery items 1105 relevant to disaster preparation may include non-perishable food items, water, and sanitary items. Energy resource items 1110 may include batteries, an electric generator, fuel (e.g., gasoline, diesel, etc.), firewood, etc. Other supplies 1115 may include home protection items, such as sandbags, plywood, tarps, etc. The items listed in FIG. 11 are exemplary only. Many other types of items may be recorded in the relevant pre-disaster purchase history.

Once the user's relevant purchase history is obtained, a pre-disaster order may be determined. The pre-disaster order may be generated based on the information collected by the system. Based on that information, a list of recommended items may be compiled. Then, the system may cross-check this list against the user's recent purchase history. Any items on the pre-disaster recommended items list that have been purchased recently may be removed from the pre-disaster order to be submitted.

Figure 12:
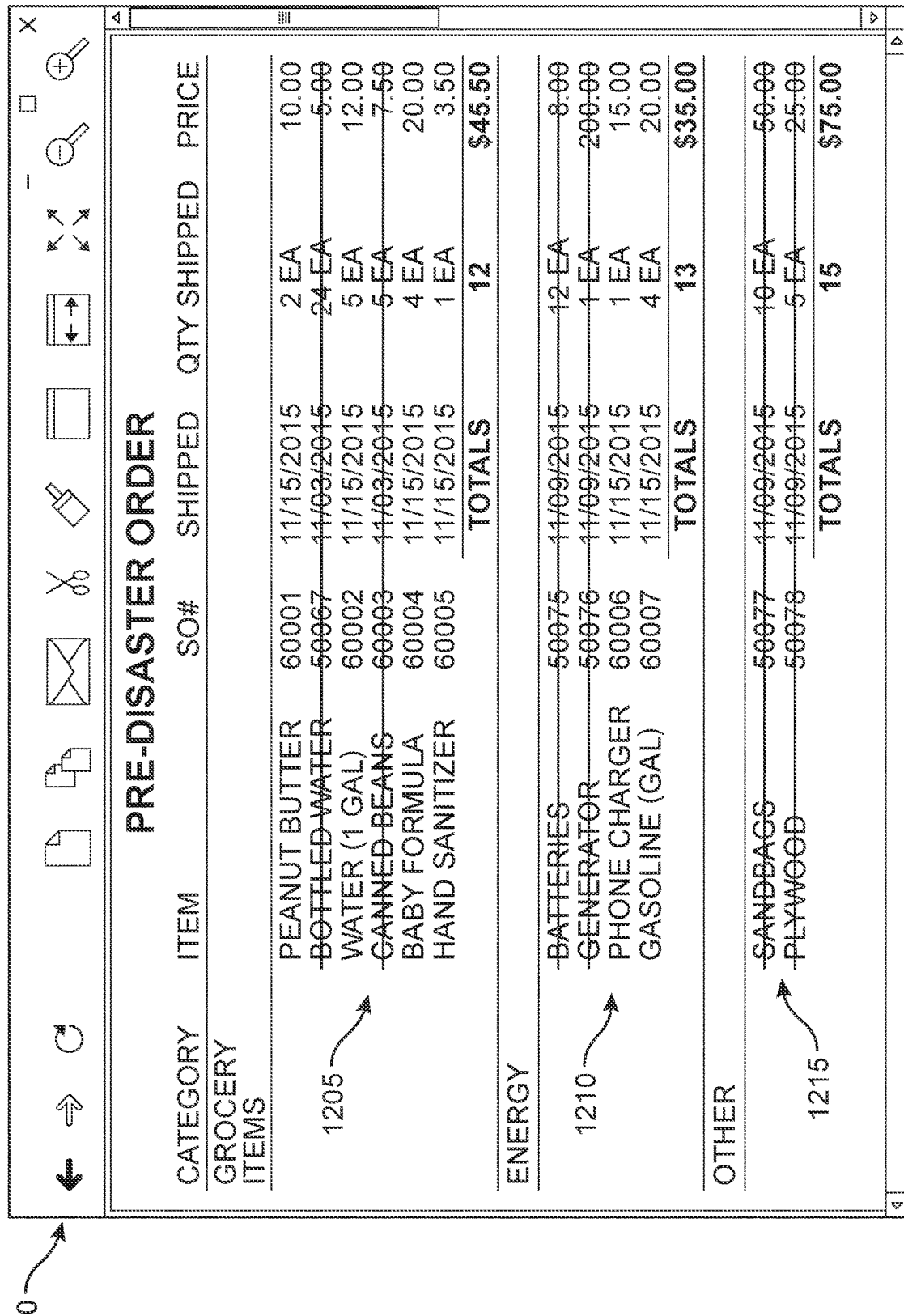
FIG. 12 is a schematic illustration of a pre-disaster order prepared by the pre-disaster preparation system to furnish a user with recommended supplies in preparation for a predicted disaster.

FIG. 12 is a schematic illustration of a pre-disaster order 1200 prepared by the pre-disaster preparation system to furnish a user with recommended supplies in preparation for a predicted disaster. As shown in FIG. 12, pre-disaster order 1200 includes the same categories of items, i.e., grocery items 1205, energy resource items 1210, and "other" items 1215. Within each category, the system removes items from the default list that have been recently purchased by the user. For example, in FIG. 12, bottled water, canned beans, batteries, a generator, sandbags, and plywood are all crossed out because the user has already purchased them recently (see FIG. 11). Pre-disaster order 1200 also includes added items, such as peanut butter, water (in gallon jugs), baby formula, hand sanitizer, a phone charger, and gasoline. The amount of each of these items may be determined by the system based on the information collected by the system. For example the amount of gasoline may be determined based on what type of generator the user has, how long the storm is forecast to last, how large the user's house is, what time of year is it (does the generator need to run an air conditioner?), etc. The amount of baby formula may be determined based on how many babies there are in the house, what ages they are, etc.

Figure 13:
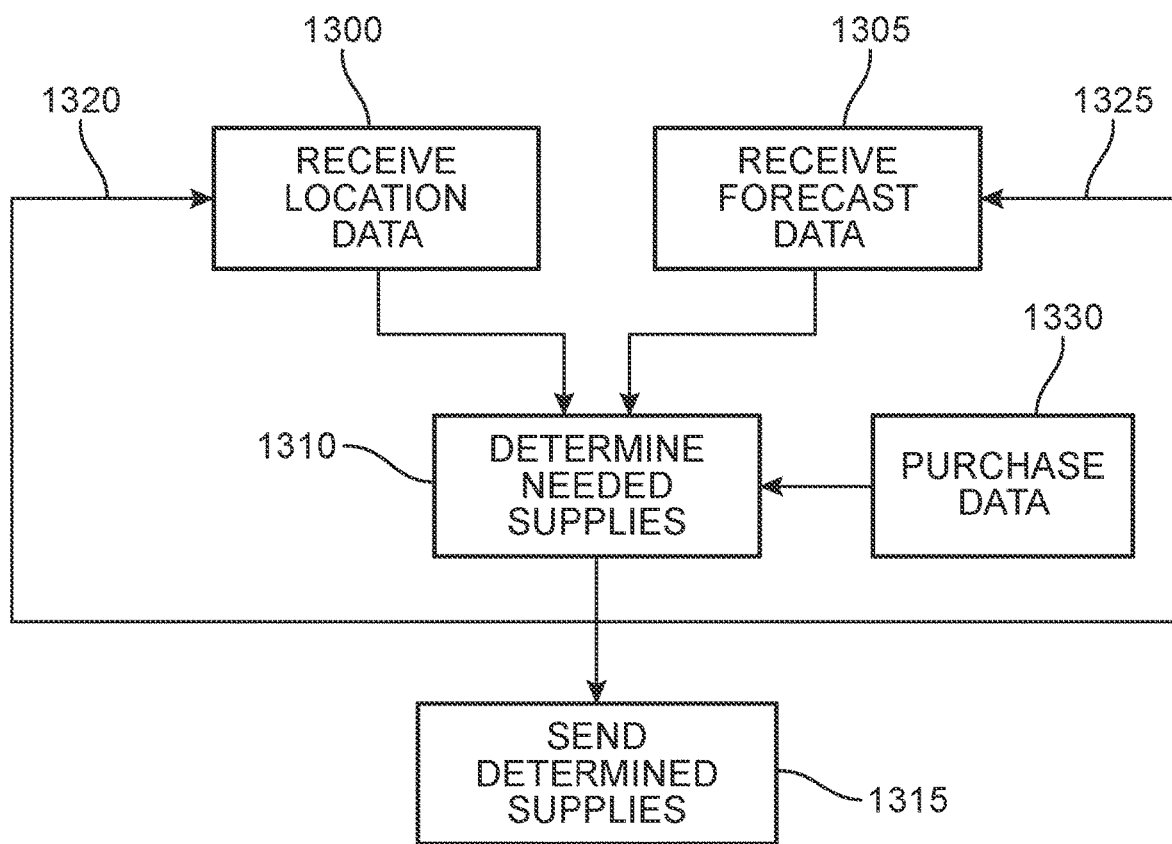
FIG. 13 is a flowchart illustrating a process of determining supplies needed by a user to prepare for a disaster and sending the determined supplies to the user.

FIG. 13 is a flowchart illustrating a process of determining supplies needed by a user to prepare for a disaster and sending the determined supplies to the user. As illustrated in FIG. 13, the computer readable medium may include instructions for receiving location data (step 1300), with a system controller, from a personal electronic device of a user. In addition, the computer readable medium may include instructions for receiving forecast data (step 1305), with the system controller, regarding a predicted disaster. Further, the computer readable medium may include instructions for making a determination of needed supplies (step 1310), based on the location data and the forecast data. Also, the computer readable medium may include instructions for sending the supplies determined to be needed (step 1315) at a predetermined time relative to the predicted time of occurrence of the predicted disaster.

As also shown in FIG. 13, the method may further include, prior to sending the supplies, changing the determination of which supplies are needed based on a change in the location data received from the personal electronic device of the user or based on a change in the forecast data received regarding the predicted disaster. Accordingly, once the needed supplies have been determined at step 1310, but prior to sending the supplies at step 1015, the system may again consider (or continuously reconsider) any newly received location data via a logic loop 1320 which returns the method to step 1300. Upon considering any changes in the received location data, the determination of which supplies are needed may change. For example, if the user's device is detected to now be outside of the predicted disaster zone, it may be concluded that the user is now out of the area, and thus, fewer supplies are needed. Similarly, the system may also again consider (or reconsider) any updated forecast data regarding an impending disaster, and change the list of needed supplies accordingly.

In some embodiments, the in order to minimize the duplication of items when providing the user with supplies, the system may receive purchase data 1330 regarding purchases made by the user within a predetermined period of time prior to the making of the determination of the preparatory action to be executed. The system may then base the determination of which supplies to be sent to the user, at least in part, on the received purchase data. Any supplies that were purchased recently by the user may be omitted from the pre-disaster purchase order.

Pre-Disaster Education System

As discussed above, there are a number of precautionary steps that residents may take in order to prepare for an impending disaster. For example, in some cases, it may be advisable to move some or all of the user's belongings in order to avoid damage or loss due to a disaster, purchasing supplies, and/or preparing one's property to withstand a predicted disaster. Further, a type of precaution may be to evacuate the area altogether. The disclosed pre-disaster education system may be configured to educate users of impending disaster conditions and/or the types of precautionary steps they should take ahead of an impending disaster based on various monitored data.

Figure 14:
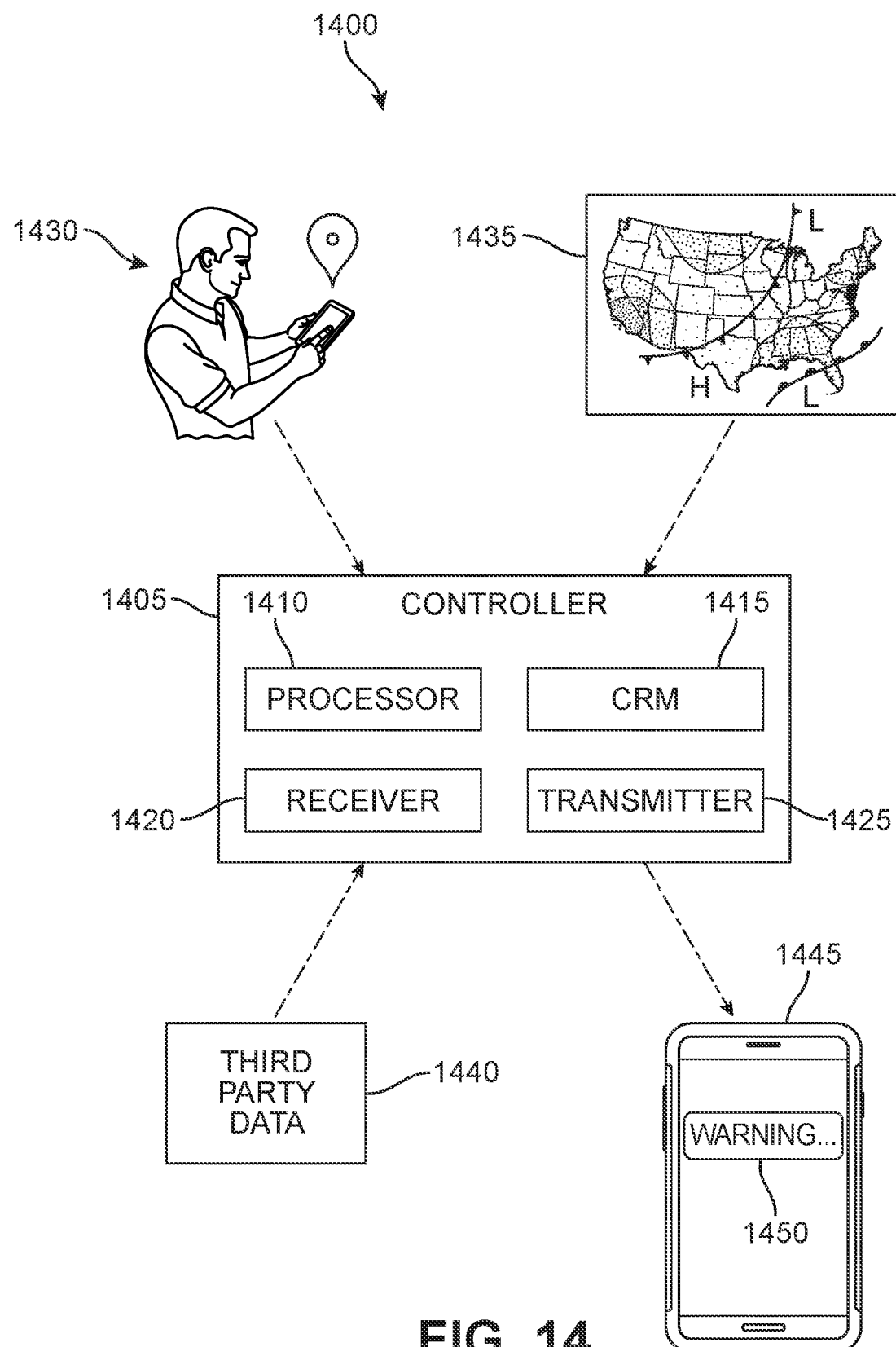
FIG. 14 is a schematic illustration of a pre-disaster education system.

FIG. 14 is a schematic illustration of a pre-disaster education system 1400. As shown in FIG. 14, system 1400 may include a system controller 1405. Controller 1405 may include various computing and communications hardware, such as servers, integrated circuits, displays, etc. Further, controller 1405 may include a device processor 1410 and a non-transitory computer readable medium 1415 including instructions executable by device processor 1410 to perform the processes discussed herein. The components of controller 1405 may be implemented in association with a mobile conditions monitoring center, such as vehicle, or in association with a control center or conditions monitoring center located in a permanent building (i.e., a brick and mortar establishment). Controller 1405 and its components may have the same or similar features as controller 105 and its components discussed above.

Also, similar to system 100 above, system 1400 may be configured to receive location data (1430) regarding a user's device, as well as forecast data (1435) regarding a predicted disaster. Further, computer readable medium 1415 may include instructions for making a determination of an educational message to be sent to the personal electronic device of the user, based on the location data and the forecast data; and sending the educational message 1450 to the personal electronic device 1445 of the user at a predetermined time relative to the predicted time of occurrence of the predicted disaster.

It will be understood that the initial determination of the educational message may be based on the amount of time remaining until the disaster when the initial determination is made. The forecast may provide a longer or shorter lead time before the disaster occurs. Also, a user may register with the pre-disaster assistance system well ahead of a predicted disaster, or shortly before the disclosed disaster. Accordingly, the amount of time remaining before the predicted occurrence of the disaster is considered when determining what the pre-disaster assistance is to be.

Also, as the amount of time remaining before the predicted occurrence of a disaster reduces, the determined assistance to be provided may change. Accordingly, in some embodiments, the computer readable medium may further include instructions for, prior to sending the educational message, changing the determination of the educational message to be sent based on a change in the location data received from the personal electronic device of the user or based on a change in the forecast data received regarding the predicted disaster. For example, if the educational message is determined by the controller and scheduled to be sent to the user 72 hours before the disaster is forecast to begin, but 84 hours prior to the predicted disaster the forecast changes, the system may change the determined preparatory action. For instance, if the initial forecast called for a very severe storm, the educational message was to include recommendations for the user to evacuate the area. If the forecast changes, and the storm is not predicted to be as severe in the user's locality, the recommendations included in the educational message may be less drastic (e.g., it may no longer recommend evacuation). The opposite change may also be made. That is, if the forecast changes to a more severe disaster, the educational message to be made may be changed to recommend more significant preparatory action rather than less significant.

In some embodiments, computer readable medium 1415 may further include instructions for receiving data from one or more third parties (1440). Exemplary third party information may include the availability of space at a shelter to which the user may proceed after evacuating their own residence. For example, a shelter facility may maintain a database indicating the amount of vacancy they have and the sizes of each vacant space (e.g., how many family members may be accepted). This information may be receivable by system 1400 in order to be considered when determining whether the user will be recommended to evacuate and to where they will be instructed to proceed.

Figure 15:
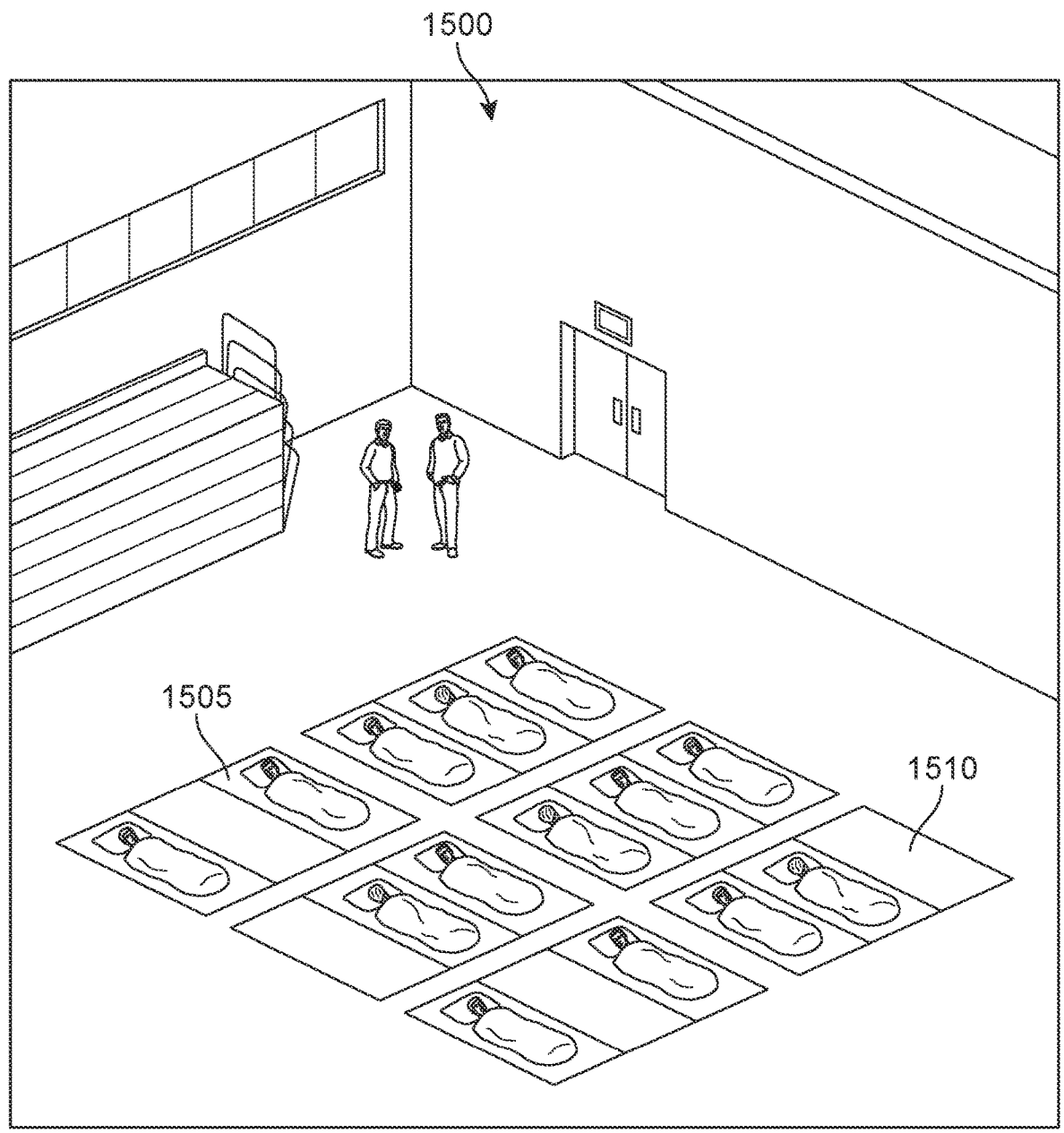
FIG. 15 is a schematic illustration of shelter facility vacancy information.

FIG. 15 is a schematic illustration of shelter facility vacancy information. As shown in FIG. 15, a shelter 1500, which may be set up in a sturdy building such as a school gymnasium as pictured, may be set up to house a particular number of persons. For example, bed spaces 1505 may be provided for each individual. As the shelter takes in people, the organization that is operating the shelter may keep track of how many people there are in the shelter, and may even assign bed spaces as the people arrive. Accordingly, the organization may have electronic records of how many vacant bed spaces 1510 remain in the shelter at a given time. The disclosed pre-disaster education system may be configured to receive such shelter vacancy data and determine the educational messages to be sent to the user accordingly.

Figure 16:
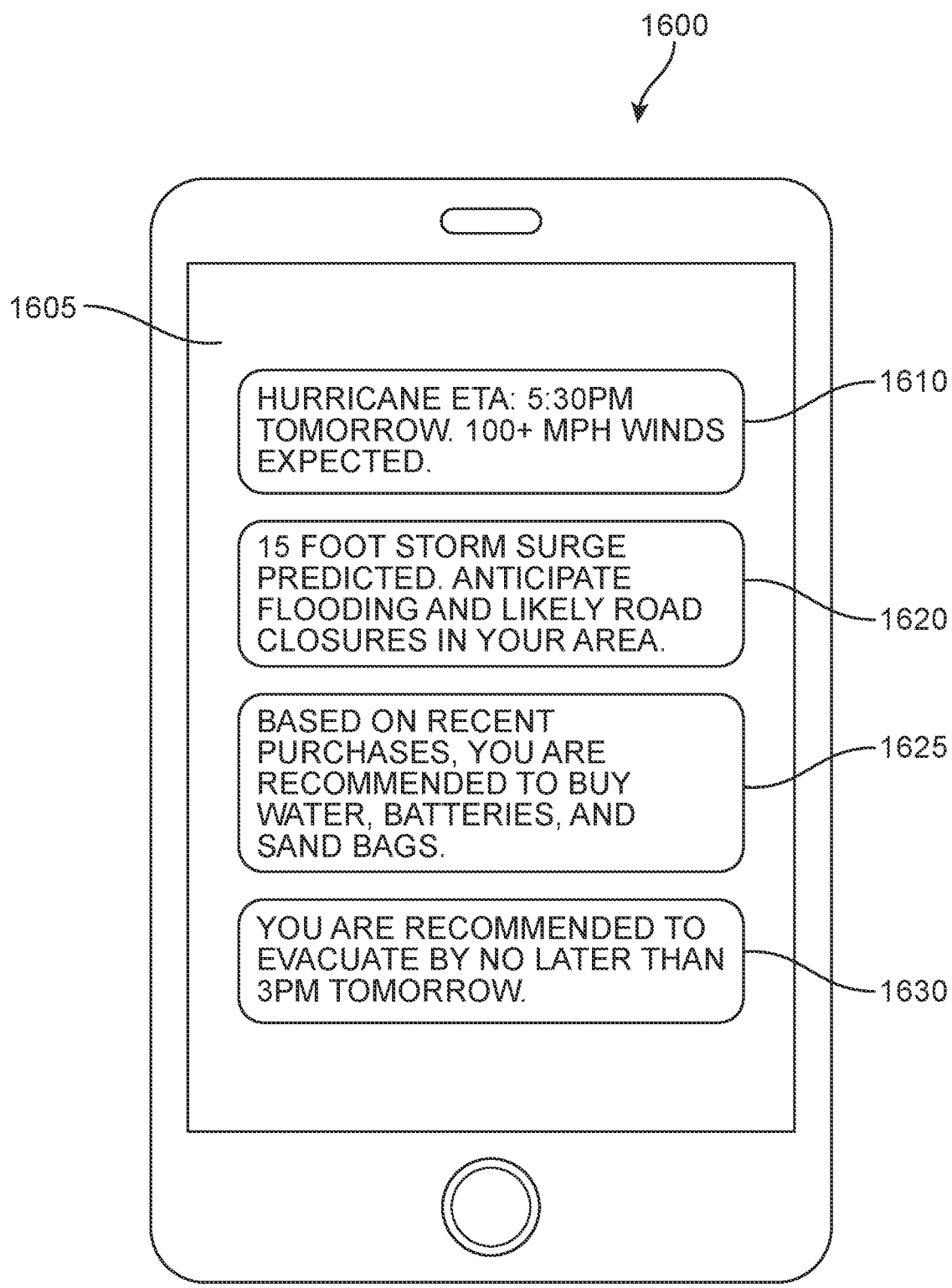
FIG. 16 is a personal electronic device interface illustrating exemplary educational messages sent to a user by a pre-disaster education system.

The types of educational messages sent by the system may vary. FIG. 16 is a personal electronic device interface illustrating exemplary educational messages sent to a user by a pre-disaster education system. As shown in FIG. 16, a personal electronic device 1600 may include a graphical user interface 1605. The features and specifications of device 1600 may be the same or similar to those discussed above with respect to other embodiments.

Interface 1605 may be configured to display educational messages sent by the disclosed pre-disaster education system. In some embodiments, the educational message may include an alert message informing the user of predicted disaster conditions in the location of the user. For example, a first message 1610 may provide a warning that identifies the type of storm, the predicted time of arrival, and relative strength (e.g., wind speed) forecast. Further details regarding expected conditions may be provided as well. For example, a second message 1620 may note further disaster conditions, such as a storm surge and the likely consequences for local residents (e.g., road closures).

In some embodiments, the system may be configured to send an instructional message with recommended precautions to be taken by the user prior to the predicted disaster. For example, third message 1625 illustrates an exemplary instructional message that provides suggestions about which items the user should purchase in preparation for the impending storm.

Further, in some embodiments, the system may be configured to send a recommendation message suggesting evacuation. For example, a fourth message 1630 may provide a recommendation for evacuation and may specify a time by which the user should leave the area.

The content, and details provided in these messages may be determined based on the data collected by the system. In addition, at registration, the user may also provide data regarding their residence, health, family members, transportation, and overall readiness. This information provided by the user may also be considered when determining what educational messages will be sent to the user.

Figure 17:
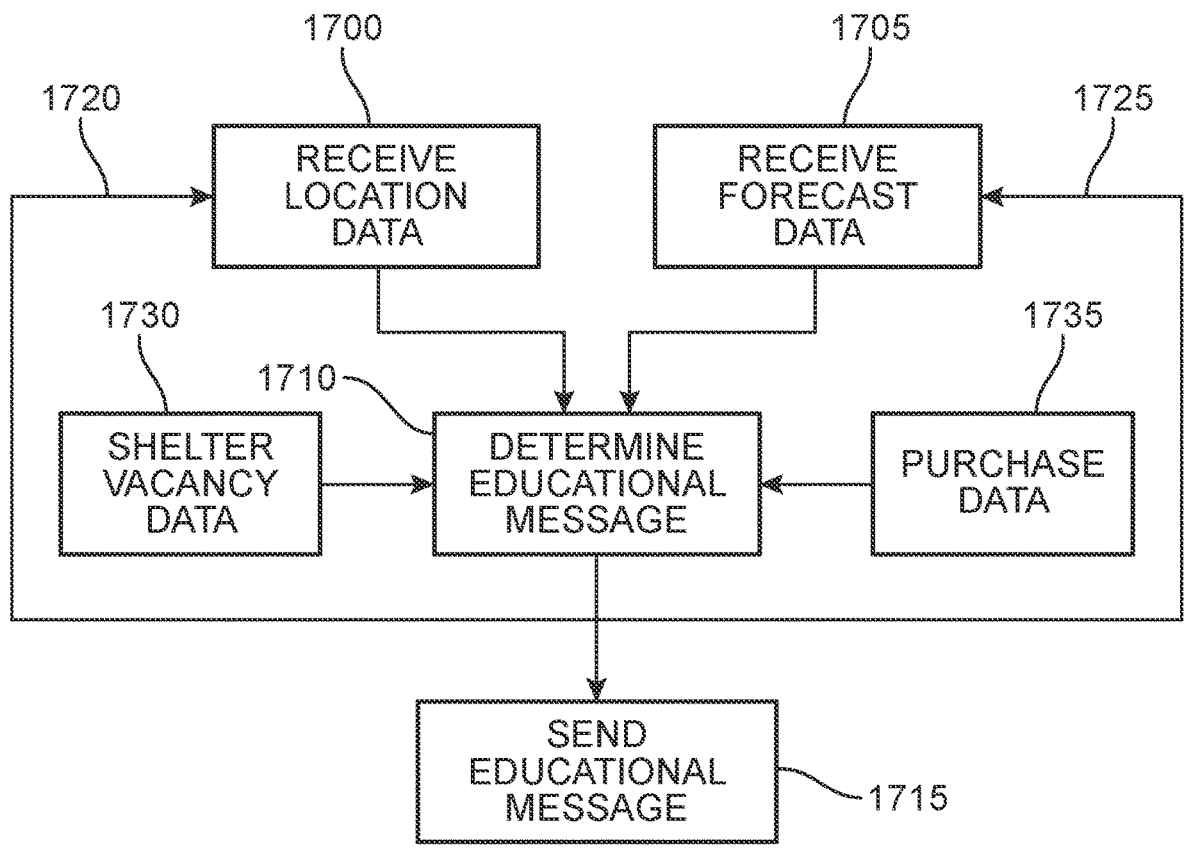
FIG. 17 is a flowchart illustrating a process of determining an educational message to be sent to a user and sending the educational message.

FIG. 17 is a flowchart illustrating a process of determining an educational message to be sent to a user and sending the educational message. As illustrated in FIG. 17, the computer readable medium may include instructions for receiving location data (step 1700), with a system controller, from a personal electronic device of a user. In addition, the computer readable medium may include instructions for receiving forecast data (step 1705), with the system controller, regarding a predicted disaster. Further, the computer readable medium may include instructions for making a determination of an educational message to be sent to the user (step 1710), based on the location data and the forecast data. Also, the computer readable medium may include instructions for sending the educational message (step 1715) at a predetermined time relative to the predicted time of occurrence of the predicted disaster.

As also shown in FIG. 17, the method may further include, prior to sending the message, changing the determination of the message to be sent based on a change in the location data received from the personal electronic device of the user or based on a change in the forecast data received regarding the predicted disaster. Accordingly, once the educational message to be sent has been determined at step 1710, but prior to sending the message at step 1715, the system may again consider (or continuously reconsider) any newly received location data via a logic loop 1720 which returns the method to step 1700. Upon considering any changes in the received location data, the determination of the educational message may change. Similarly, the system may also again consider (or reconsider) any updated forecast data regarding an impending disaster, and change the determination of the educational message to be sent.

In addition, the computer readable medium of the system may include instructions for receiving data from one or more third parties. For example, in FIG. 17, the system may be configured to receive shelter vacancy data 1730 from a shelter facility. In such cases, the educational message to be sent may be determined, at least in part, on the shelter vacancy data.

In some embodiments, the educational message may include a recommendation that the user purchase certain supplies. Such supplies may be include such items as food items, home protection items, tools, fuel, electrical generation equipment, batteries, etc. (See discussion of FIGS. 11 and 12 above.) In order to minimize the duplication of items when providing the user with supplies, the system may receive purchase data 1735 regarding purchases made by the user within a predetermined period of time prior to the making of the determination of the educational message to be sent. The system may then base the determination of which supplies the user will be recommended to purchase, at least in part, on the received purchase data. Any supplies that were purchased recently by the user may be omitted from the pre-disaster purchase recommendation.

The embodiments discussed herein may make use of methods and systems in artificial intelligence to improve efficiency and effectiveness of the disclosed systems. As used herein, "artificial intelligence" may include any known methods in machine learning and related fields. As examples, artificial intelligence may include systems and methods used in deep learning and machine vision.

While various embodiments have been described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with, or substituted for, any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

We claim:

1. A disaster preparation system, comprising:
 a system controller including:
  a device processor; and a non-transitory computer readable medium including instructions executable by the device processor to perform the following steps:
receiving location data from a personal electronic device of a user;
receiving forecast data regarding a predicted disaster;
making a determination of a preparatory action to be executed on behalf of the user, based on the location data and the forecast data; and
executing the preparatory action at a predetermined time relative to the predicted time of occurrence of the predicted disaster;
wherein the preparatory action includes making a determination of one or more supplies to be sent to the user and coordinating an order for a delivery of the one or more supplies to the user; and
wherein the computer readable medium further includes instructions for receiving purchase data regarding purchases made by the user within a predetermined period of time prior to the making of the determination of the preparatory action to be executed, and basing the determination of one or more supplies to be sent to the user, at least in part, on the received purchase data.

2. The system of claim 1, wherein the computer readable medium further includes instructions for, prior to executing the preparatory action, changing the determination of the preparatory action to be executed based on a change in the location data received from the personal electronic device of the user or based on a change in the forecast data received regarding the predicted disaster.

3. The system of claim 1, wherein the preparatory action includes coordinating an order of a moving service to move belongings of the user.

4. The system of claim 3, wherein coordinating the order of the moving service includes determining a size of a moving vehicle based on an amount of belongings indicated by the user.

5. The system of claim 3, wherein coordinating the order of the moving service includes determining a size of a moving vehicle based on an amount of time remaining prior to the predicted disaster.

6. The system of claim 1, wherein the computer readable medium further includes instructions for receiving data from one or more third parties.

7. The system of claim 6, wherein the data received from one or more third parties includes vacancy data from a storage facility.

8. The system of claim 7, wherein the preparatory action includes coordinating an order of a moving service to move belongings of the user.

9. The system of claim 8, wherein coordinating the order of the moving service includes determining a size of a moving vehicle based, at least in part, on the vacancy data.

10. The system of claim 1, wherein the supplies are selected from the group including food items, home protection items, tools, fuel, electrical generation equipment, and batteries.

11. A disaster preparation method, comprising:
receiving location data, with a system controller, from a personal electronic device of a user;
receiving forecast data, with a system controller, regarding a predicted disaster;
making a determination of a preparatory action to be executed on behalf of the user, based on the location data and the forecast data; and
executing the preparatory action at a predetermined time relative to the predicted time of occurrence of the predicted disaster;
wherein the preparatory action includes making a determination of one or more supplies to be sent to the user and coordinating an order for a delivery of the one or more supplies to the user;
further including receiving purchase data regarding purchases made by the user within a predetermined period of time prior to the making of the determination of the preparatory action to be executed, and basing the determination of one or more supplies to be sent to the user, at least in part, on the received purchase data.

12. The method of claim 11, further including, prior to executing the preparatory action, changing the determination of the preparatory action to be executed based on a change in the location data received from the personal electronic device of the user or based on a change in the forecast data received regarding the predicted disaster.

13. The method of claim 11, wherein the preparatory action includes coordinating an order of a moving service to move belongings of the user.

14. The method of claim 13, wherein coordinating the order of the moving service includes determining a size of a moving vehicle based on an amount of belongings indicated by the user.

15. The method of claim 13, wherein coordinating the order of the moving service includes determining a size of a moving vehicle based on an amount of time remaining prior to the predicted disaster.

16. The method of claim 11, further including receiving data from one or more third parties.

17. The method of claim 16, wherein the data received from one or more third parties includes vacancy data from a storage facility.

18. The method of claim 17, wherein the preparatory action includes coordinating an order of a moving service to move belongings of the user.

19. The method of claim 18, wherein coordinating the order of the moving service includes determining a size of a moving vehicle based, at least in part, on the vacancy data.

20. The method of claim 11, wherein the supplies are selected from the group including food items, home protection items, tools, fuel, electrical generation equipment, and batteries.

* * * * *